(12) United States Patent
Müller et al.

(10) Patent No.: US 12,085,378 B2
(45) Date of Patent: Sep. 10, 2024

(54) SURVEYING SYSTEM AND AUXILIARY MEASURING DEVICE

(71) Applicant: LEICA GEOSYSTEMS AG, Heerbrugg (CH)

(72) Inventors: Josef Müller, Oberegg (CH); Jochen Scheja, Hohenems (AT); Oliver Faix, Diepoldsau (CH); Thomas Bösch, Lustenau (AT); Claudio Iseli, Au (CH); Hannes Maar, Dornbirn (AT); Patrik Lengweiler, Maienfeld (CH); Markus Geser, Horn (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 686 days.

(21) Appl. No.: 17/290,218

(22) PCT Filed: Oct. 31, 2018

(86) PCT No.: PCT/EP2018/079910
§ 371 (c)(1),
(2) Date: Apr. 29, 2021

(87) PCT Pub. No.: WO2020/088768
PCT Pub. Date: May 7, 2020

(65) Prior Publication Data
US 2021/0372768 A1 Dec. 2, 2021

(51) Int. Cl.
*G01C 15/06* (2006.01)
*G01B 11/00* (2006.01)
*G01C 15/00* (2006.01)

(52) U.S. Cl.
CPC .......... *G01B 11/002* (2013.01); *G01C 15/002* (2013.01); *G01C 15/06* (2013.01)

(58) Field of Classification Search
CPC .... G01B 111/002; G01C 15/002; G01C 15/06
(Continued)

(56) References Cited

U.S. PATENT DOCUMENTS

| 5,337,149 A | 8/1994 | Kozah et al. |
| 5,893,214 A * | 4/1999 | Meier ................... G02B 5/122 |
| | | 33/293 |

(Continued)

FOREIGN PATENT DOCUMENTS

| CN | 102778893 A | 11/2012 |
| CN | 103477187 A | 12/2013 |

(Continued)

OTHER PUBLICATIONS

CN Office Action dated Dec. 28, 2023 as received in Application No. 202111508071.9.
(Continued)

*Primary Examiner* — George B Bennett
(74) *Attorney, Agent, or Firm* — Maschoff Brennan

(57) ABSTRACT

An auxiliary measuring instrument, configured to form together with a ground-based surveying device having range-and-direction measuring functionality, a system for surveying or staking out object points, wherein the auxiliary measuring instrument including a handheld main body of a defined length, and a man-machine interface, wherein the auxiliary measuring instrument is designed in a pen-like form and size and is configured to aim at an object point to be surveyed or staked out in a one-handed manner with a first end of the auxiliary measuring instrument and wherein a body is attached at a second end of the auxiliary measuring instrument, wherein the body is designed for optical-image-based determination of the position of the auxiliary measuring instrument by the surveying device.

30 Claims, 13 Drawing Sheets

(58) Field of Classification Search
USPC .................................. 33/293, 294; 356/4.01
See application file for complete search history.

(56) References Cited

U.S. PATENT DOCUMENTS

| | | | |
|---|---|---|---|
| 7,541,974 | B2 | 6/2009 | Scherzinger |
| 8,503,053 | B2 | 8/2013 | Graham et al. |
| 8,902,408 | B2 | 12/2014 | Bridges |
| 9,222,771 | B2 | 12/2015 | Rosengaus et al. |
| 9,377,298 | B2 | 6/2016 | Zogg et al. |
| 9,377,301 | B2 | 6/2016 | Neier et al. |
| 9,497,383 | B2 | 11/2016 | Lienhart |
| 9,594,167 | B2 | 3/2017 | Zogg et al. |
| 9,720,087 | B2 | 8/2017 | Christen et al. |
| 9,772,185 | B2 | 9/2017 | Metzler |
| 9,816,813 | B2 * | 11/2017 | Lettau ................. G01S 7/481 |
| 9,958,269 | B2 | 5/2018 | Metzler et al. |
| 10,240,924 | B2 | 3/2019 | Metzler |
| 10,337,865 | B2 | 7/2019 | Green et al. |
| 10,488,519 | B2 | 11/2019 | Nishita |
| 10,713,607 | B2 | 7/2020 | Pettersson et al. |
| 10,921,430 | B2 | 2/2021 | Ohtomo et al. |
| 11,048,898 | B2 | 6/2021 | Suman et al. |
| 11,313,680 | B2 | 4/2022 | Kumagai |
| 11,333,497 | B2 * | 5/2022 | Eisenreich ........... G01C 15/006 |
| 11,435,182 | B2 | 9/2022 | Hajmousa et al. |
| 11,493,341 | B2 | 11/2022 | Müller et al. |
| 11,506,492 | B2 | 11/2022 | Nakaniwa |
| 11,536,568 | B2 | 12/2022 | Nishita |
| 11,785,683 | B2 * | 10/2023 | Comini ................. G01N 21/93 356/36 |
| 2008/0036646 | A1 | 2/2008 | Green et al. |
| 2012/0124850 | A1 | 5/2012 | Ortleb et al. |
| 2013/0093882 | A1 | 4/2013 | Kotzur et al. |
| 2013/0176305 | A1 | 7/2013 | Ito et al. |
| 2014/0343890 | A1 | 11/2014 | Lettau et al. |
| 2014/0373369 | A1 * | 12/2014 | Bockem ............... G01C 15/002 33/228 |
| 2015/0219451 | A1 | 8/2015 | Pettersson et al. |
| 2022/0011105 | A1 * | 1/2022 | Hotz ..................... G01C 1/02 |
| 2022/0252396 | A1 * | 8/2022 | Kikuchi ................ G01S 17/86 |
| 2022/0364861 | A1 | 11/2022 | Rothbucher |
| 2023/0314618 | A1 | 10/2023 | Metzler |

FOREIGN PATENT DOCUMENTS

| | | |
|---|---|---|
| CN | 103782132 A | 5/2014 |
| CN | 104142122 A | 11/2014 |
| CN | 104142505 A | 11/2014 |
| CN | 104583709 A | 4/2015 |
| CN | 104769454 A | 7/2015 |
| CN | 105358937 A | 2/2016 |
| CN | 107220741 A | 9/2017 |
| CN | 108604285 A | 9/2018 |
| DE | 19602327 A1 | 7/1997 |
| DE | 102008001617 A1 | 11/2009 |
| DE | 102010024014 A1 | 12/2011 |
| EP | 1130355 A2 | 9/2001 |
| EP | 1645846 A1 | 4/2006 |
| EP | 2405236 B1 | 1/2012 |
| EP | 2 570 768 A1 | 3/2013 |
| EP | 2594895 A2 | 5/2013 |
| EP | 2 765 388 A1 | 8/2014 |
| EP | 2 787 322 A1 | 10/2014 |
| EP | 3333538 A1 | 6/2018 |
| EP | 3415866 A1 | 12/2018 |
| JP | 2002528709 A | 9/2002 |
| JP | 2007-281672 A | 10/2007 |

OTHER PUBLICATIONS

CN Office Action dated Jan. 31, 2024 as received in Application No. 202111508055.X.
Extended Search Report from corresponding EP Application No. 21210064, Feb. 28, 2022.
EP Office Action dated Jun. 19, 2023 as received in Application No. 21210064.8.

* cited by examiner

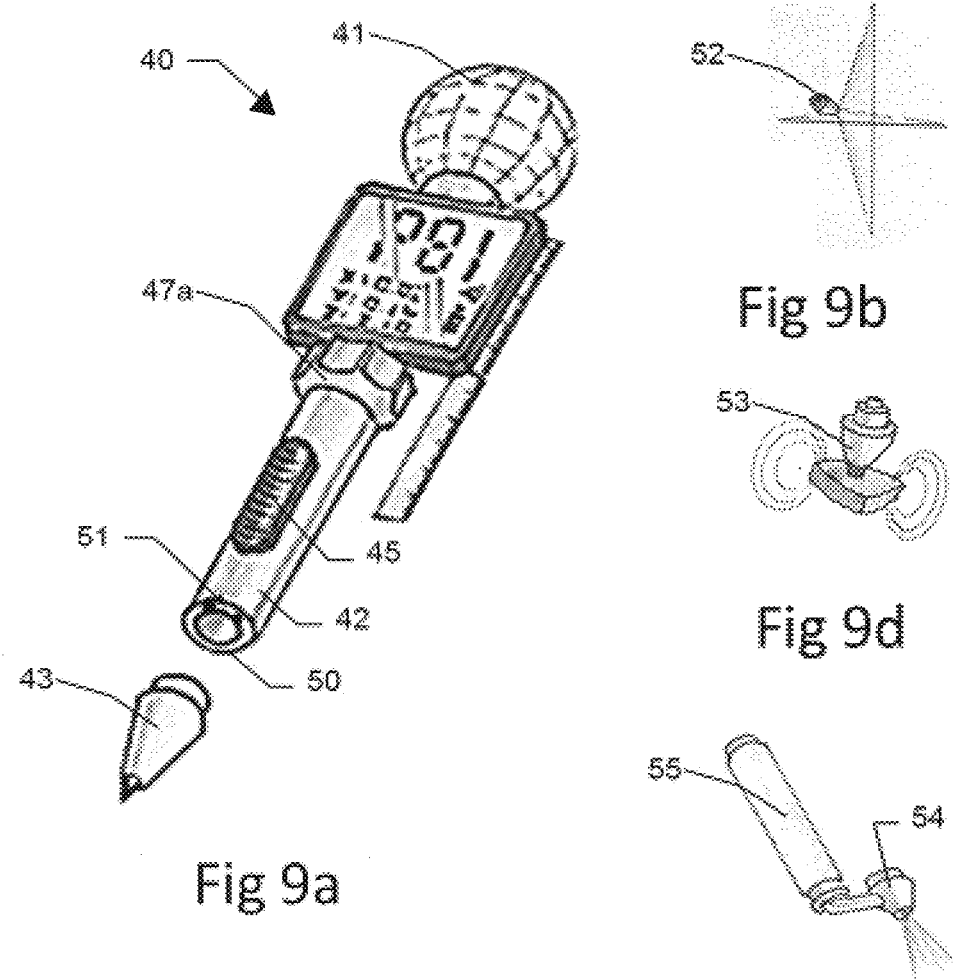
Fig 9a
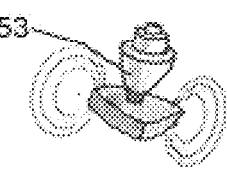
Fig 9b
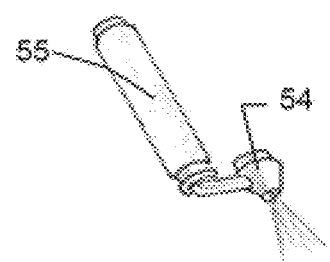
Fig 9d
Fig 9c
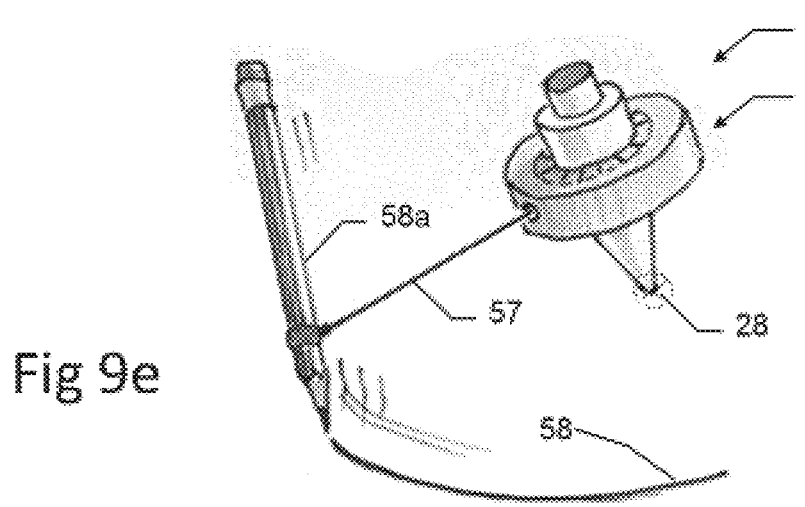
Fig 9e

SURVEYING SYSTEM AND AUXILIARY MEASURING DEVICE

CROSS-REFERENCE TO RELATED APPLICATIONS

This application claims priority to European Patent Application No. 2018079910, filed on Oct. 31, 2018. The foregoing patent application is herein incorporated by reference.

FIELD OF THE INVENTION

The invention relates to an auxiliary measuring instrument, a surveying system or surveying device and a position-determining or marking method.

BACKGROUND

Surveying systems for determining positions in the field of geodesy or the area of construction sites and/or construction are known in manifold forms. Examples of these are systems made up of a stationary surveying device with a direction and range meter, such as for example a total station, and an auxiliary measuring instrument marking a point to be surveyed or identified, such as for example a plumbing pole. Also known are layout systems made up of a stationary laser emitter, which by means of a laser beam generates a position reference, which can be received by a laser receiver at the point to be marked. Surveying activities are thus performed by the interaction of a stationary device at a known location, which thus offers a position reference, with a receiving or marking and/or targetable measuring aid, whereby the position of individual terrain points such as land surveying points or points on construction site objects, for example in the interior or exterior area of buildings or in road construction, can be determined precisely with respect to position measurement or stake out.

BRIEF SUMMARY

The object of the present invention is to provide an improved surveying system or improved system device and improved surveying method.

This object is achieved by the implementation of the characterizing features of the independent claims. Features which refine the invention in an alternative or advantageous manner can be inferred from the dependent patent claims and the description, including the descriptions of the figures. All of the embodiments of the invention that are shown or otherwise disclosed in this document can be combined with one another unless otherwise expressly stated.

A first aspect of some aspects of the invention relates to an auxiliary measuring instrument, in particular a surveying pole or plumbing pole, which is designed to form together with a ground- based, in particular stationary, surveying device having range-and-direction measuring functionality, in particular a total station, a system for surveying and/or staking out terrain points. "Terrain point" should be understood here in a broad sense and comprises for example not only points on open or free terrain, but also points of or on buildings or construction sites, both in the interior area and exterior area. The auxiliary measuring instrument has a handheld main body with a defined longitudinal axis, so that the auxiliary measuring instrument can be used as a handy means for aiming at a terrain point. The auxiliary measuring instrument is designed for example as a pole, the one end of which can be positioned on the terrain point. Solutions in which the point is not aimed at physically, but for example by the measuring beam of a distance meter, are also known from the prior art and included here. In any event, a distance from a, in particular reference point of the main body to the terrain point is predefined or given or can be determined by the auxiliary measuring instrument itself.

Furthermore, the auxiliary measuring instrument has a target, which is attached to the main body in a defined and known spatial relationship with the longitudinal axis and with the reference point and the position of which can be determined by the surveying device, so that, by targeting at the terrain point with the measuring instrument, a target position linked with the terrain point can be displayed.

Furthermore, the auxiliary measuring instrument has on the main body, in a defined and known spatial relationship with the longitudinal axis, an attached body, preferably a sphere attachment, in particular wherein the center of the body is arranged on the longitudinal axis. The body bears on its surface a two-dimensional code, which can be bijectively evaluated by image processing, so that an orientation of the attachment, and consequently (with knowledge of the defined and known relationship) the orientation (roll, pitch and yaw angles) of the auxiliary measuring instrument can be determined.

Optionally, the code is designed and distributed over the surface of the body in such a way that the orientation of the auxiliary measuring instrument can be bijectively determined on the basis of a segment of the surface of the body, and consequently the code, recorded in a camera image.

As a further option, the code has at least a first and second resolution stage, wherein the first resolution stage is designed for image recording and code evaluation in the near range and the second resolution stage is designed for image recording and code evaluation in the far range and/or the first resolution stage serves for coarse inclination and orientation determination and the second resolution stage serves for fine inclination and orientation determination. For example, the code has precisely three resolution stages.

In a further development, the code is arranged in two parts on the surface of the sphere, in that a first part serves for coding a first direction on the surface of the sphere, in particular the length or the longitude, and a second part serves for coding a second direction, in particular the width or the latitude, in particular wherein the first part and the second part are of different colors, for example red and green. Color is understood here as also meaning colors that lie outside the visible range, for example in the near IR spectrum or in the UV range.

Optionally, the target is integrated in the sphere attachment, for example in that the surface of the sphere has a multiplicity of retroreflectors which can be aimed at by the surveying device. As a further option, the auxiliary measuring instrument has a light source, with which the surface of the sphere can be illuminated, in particular wherein the light source is arranged in the interior of the sphere attachment. As a further option, the light source can be activated in such a way that, by varying the illumination, for example changing the color and/or intensity (for example flashing), a transmission of information is made possible, for example to the surveying device. Thus, for example, the current status of the surveying device, for example the readiness for use or an ID, can be communicated by means of a light signal or instructions to a user can be given on the surveying device.

As an additional or alternative, the sphere attachment has at least one outer layer of unbreakable, in particular elastic, material and is arranged on the main body, and sufficiently largely dimensioned, in such a way that damage to the auxiliary measuring instrument in the event of impact is minimized or prevented by the sphere attachment.

The invention also relates to a ground-based, for example geodetic, surveying system with a, in particular stationary, surveying device having range-and-direction measuring functionality, in particular a total station, and an auxiliary measuring instrument as described above, wherein the surveying device has a camera, by means of which a two-dimensional image at least of a segment of the surface of the sphere attachment can be recorded, and the system has a decoding instruction (a decoding algorithm or decoding information), stored in a memory, for decoding the code and also a controller with decoding functionality, which is designed to evaluate the camera image on the basis of the decoding information in such a way that an orientation of the auxiliary measuring instrument can be bijectively determined.

In a development of the surveying system, the controller is designed in such a way that, as part of the decoding functionality, a circle is fitted to the depiction of the sphere in the camera image, the center of the depiction of the sphere is ascertained by means of the fitted circle and the code that is present in a surface segment situated around the center is decoded.

Optionally, the surveying device of the surveying system has a base, a targeting unit, in particular a telescopic sight, which defines a target direction and can be pivoted with respect to the base about at least one axis, in particular two axes orthogonal to one another, for aiming at the target, at least one angle meter and also an angle-measuring functionality for measuring the target direction, a range meter for measuring a range from the target in the target direction, and a controller with single-point determining functionality, in the execution of which, controlled by the controller, a position of a terrain point designated with the aid of the auxiliary measuring instrument within an area of terrain is determined on the basis of the measured target direction, the range between the target and the surveying device and the inclination and orientation of the auxiliary measuring instrument determined on the basis of the sphere attachment.

Optionally, the targeting unit of such a surveying device has a beam source for generating a measuring radiation, preferably laser radiation, and also has an optical unit for emitting the measuring radiation as a free beam in the target direction and an electro-optical detector for detecting measuring radiation reflected by the target, from which the range from the target can be determined, wherein, in the execution of the single-point determining functionality, the target of the auxiliary measuring instrument is aimed at by means of setting the target direction, so that measuring radiation hits the target, and the range between the target and the surveying device is determined by means of the measuring radiation.

As a further option, the surveying system has a drive for automatically changing the target direction and a target-tracking functionality, so that, on activation of the target-tracking functionality, the target direction automatically follows a moving auxiliary measuring instrument, wherein the target-tracking functionality is based on an evaluation of the camera image of the sphere attachment, in particular wherein, as part of the target-tracking functionality, images of the sphere attachment are continuously recorded and the target direction is continuously changed in such a way that the depiction of the sphere is kept at the center of the images.

Optionally, the code is designed in such a way that the code can be bijectively evaluated irrespective of the range of the surveying device from the auxiliary measuring instrument (of course within certain limits or up to a maximum distance). For example, the camera of the surveying device is then equipped with an autofocus, in order to produce a sharp image of the code automatically, irrespective of the distance.

The invention also relates to a method for determining the position of a terrain point with the steps of aiming at the terrain point with an auxiliary measuring instrument as described above, measuring the range from and direction in relation to the target provided by the auxiliary measuring instrument during the aiming at the terrain point from a ground-based surveying device, in particular a total station, providing the distance between the target and the terrain point (that is to say knowing the previously fixed distance and/or measuring a variable distance, for example by means of a laser distance meter of the auxiliary measuring instrument), determining the inclination and orientation of the auxiliary measuring instrument by means of image evaluation of a camera image, in which at least part of the body provided with a 2D code is depicted, and determining the position of the terrain point, starting from a known position of the surveying device, on the basis of the range and direction, the distance and the orientation.

Optionally, the method includes tracking of the auxiliary measuring instrument on the basis of a series of images of the attached body recorded by the surveying device, for example in that in each case a deviation of the position in the camera image of the sphere from an ideal position (for example center of the image) is determined and, on the basis of the deviations, the alignment of the surveying device is continuously changed, that is to say the target direction is made to track the movement of the auxiliary measuring instrument.

The present invention also includes a computer program product or a computer data signal, which is embodied by an electromagnetic wave, with program code, for controlling or carrying out the method according to the invention for determining the position of a terrain point with an auxiliary measuring instrument described above with sphere coding, in particular when the program is executed in a controlling and evaluating unit of a surveying system according to the invention.

In a further aspect, the invention relates to a ground-based, in particular geodetic, surveying system for surveying and/or staking out terrain points with a, in particular stationary, surveying device having range-and-direction measuring functionality, in particular a total station, and an auxiliary measuring instrument, wherein the surveying device has a base, targeting unit, in particular a telescopic sight, which defines a target direction and can be pivoted with respect to the base about at least one axis, in particular two axes orthogonal to one another, a range meter and also a range-measuring functionality for measuring a range from the target in the target direction, and at least one angle meter and also an angle-measuring functionality for measuring the target direction. The auxiliary measuring instrument has a handheld rod, the one end of which is intended for physically contacting a terrain point, and a target, which is attached to the rod, in particular at the other end, and can be aimed at by the surveying device, wherein the target is attached to the rod at a distance from the contact end that is defined and stored in a memory of the surveying system, so that a target position linked with the terrain point can be provided by contacting the terrain point with the contact end.

Furthermore, the surveying system has a controller with evaluating functionality, wherein, as part of the evaluating functionality, the target position can be determined on the basis of the target direction and the range between the target and the surveying device, and the controller has a calotte measuring functionality for determining the position of a terrain point, wherein, in the execution of the calotte measuring functionality, on the basis in each case of the target direction and the range, at least three non-coplanar target positions linked with the terrain point are determined, wherein the non-coplanar target positions are provided for example by at least three different alignments or inclinations of the rod of the auxiliary measuring instrument contacting the terrain point. Furthermore, as part of the calotte measuring functionality, a calotte together with an associated sphere center point is calculated on the basis of the three target positions and the stored distance between the target and the contact end, and the sphere center point is adopted as the position of the terrain point.

As an alternative, the target need not be attached at a defined, known distance from the contact end, in that the calotte calculation is not based on three, but at least four, non-coplanar target positions. A possibly known distance between the target and the terrain point can then be optionally used for increasing the robustness of the calotte calculation or point determination or for verifying the result of the calculation.

Optionally, the target of the auxiliary measuring instrument is retroreflective and the targeting unit has a beam source for generating a measuring radiation and an optical unit for directionally emitting the measuring radiation as a free beam in the target direction and also an electro-optical detector for detecting measuring radiation reflected by the target, so that the range from the target used for determining the position of the target can be determined on the basis of detected measuring radiation.

As a further option, the auxiliary measuring instrument has a user display and the controller is designed in such a way that, as part of the calotte functionality, an instruction with respect to pivoting the auxiliary measuring instrument for generating the non-coplanar target positions, in particular with respect to an optimum, in particular homogeneous and/or large-area, arrangement of the target positions, is displayed to a user on the user display.

In a development, the instruction is provided on the basis of a camera image of the auxiliary measuring instrument and its surrounding area when contacting the terrain point, wherein the camera image is recorded by means of a camera of the surveying device. Optionally, on the basis of the camera image, an ascertainment of a pivoting area to be excluded, which is unsuitable, in particular impossible, for an aiming of the contacting auxiliary measuring instrument by means of the surveying device, is performed, and/or an ascertainment of an optimum pivoting area, which is particularly well-suited for an aiming of the contacting auxiliary measuring instrument by means of the surveying device, is performed. As an alternative or in addition, the instruction or user prompting is based on at least the first determined target position.

As a further option, the instruction takes place graphically, in that a graphic indication of a pivoting area and/or individual pivoting positions with respect to a pivoting movement to be executed of the contacting auxiliary measuring instrument takes place on the user display (for example recommended and/or unfavorable ranges or positions). For example, the graphic indication is embedded in a camera-image-based depiction (that is to say a camera image or else a virtual depiction calculated therefrom) of the surrounding area of the contacting auxiliary measuring instrument, wherein the camera image is recorded by means of a camera of the surveying device and/or shows a perspective of the user of the auxiliary measuring instrument and/or its location.

Optionally, the target positions are kept in a temporary memory of the surveying system and are abandoned or erased after completion of the determination of the terrain point.

The invention also relates to a method for determining the position of a terrain point by means of a surveying system described above with calotte measuring functionality, wherein the method comprises the following steps: contacting the terrain point with the contact end of the auxiliary measuring instrument, pivoting the contacting auxiliary measuring instrument, so that at least three different target positions linked with the terrain point are provided, determining the at least three target positions by means of the surveying device, calculating a calotte on the basis of the at least three target positions and the known distance between the target and the contact end of the auxiliary measuring instrument by calculating the sphere center point associated with the calotte, whereby the position of the terrain point is determined by the sphere center point, or the steps of: contacting the terrain point with the contact end of the auxiliary measuring instrument, pivoting the contacting auxiliary measuring instrument, so that at least four different target positions, linked with the terrain point, are provided, determining the at least four target positions by means of the surveying device, calculating a flattened dome on the basis of the at least four target positions by calculating the sphere center point associated with the calotte, whereby the position of the terrain point is determined by the sphere center point.

Optionally, during the pivoting, automatic target tracking and automatic determination of the target position are performed by the surveying device.

As a further option, an output of a warning to a user takes place if the determination of the target positions is inadequate or impossible on account of absent or inadequate capability of aiming at the target by the surveying device.

In a development of the method, an automatic or user-side assessment of the quality of the position of the terrain point takes place is performed, wherein, with the quality assessed as insufficient, renewed or additional determination of target positions takes place. In this case, an automatic generation of a measure of quality, which is based on an overdetermination of the calculated calotte (for example overdetermination due to the presence of more than the three or four necessary positioning points or due to knowledge of the actual distance between the target and the contact point) optionally takes place is performed for the assessment. As a further option, for a user-side assessment, a graphic representation based on the position of the terrain point is generated.

As a further option, an automatic ending of the determination of target positions takes place is performed as soon as a predefined termination criterion is satisfied, in particular a maximum period of time has elapsed, a required accuracy has been achieved and/or a minimum number of target positions has been determined.

Optionally, the determination of target positions and calculation of the calotte proceed simultaneously in such a way that the calculation is performed as soon as there are a minimum number of target positions and further target positions serve for the continuous updating and/or refinement of the calculated calotte.

Some aspects of the present invention also includes a computer program product or a computer data signal, which is embodied by an electromagnetic wave, with program code, for controlling or carrying out the method according to the invention for determining the position of a terrain point by means of calotte calculation or calotte measuring functionality, in particular when the program is executed in a controlling and evaluating unit of a surveying system according to the invention.

In a third aspect, the invention relates to an auxiliary measuring instrument which is designed to form together with a ground-based, in particular stationary, surveying device having range-and-direction measuring functionality, in particular a total station, a system for, in particular geodetically, surveying and/or staking out object points. The auxiliary measuring instrument has a handheld main body of a defined length, and at least one element which is arranged in a defined manner on the main body and is designed to measure the position and orientation of the auxiliary measuring instrument in interaction with the surveying device. For this, a body, in particular a sphere, is attached at a second end of the auxiliary measuring instrument. The body is in this case intended for the optical-image-based determination of the position of the auxiliary measuring instrument by the surveying device.

Preferably, the body is the bearer of a 2D code on its surface and is in this case designed in such a way that an orientation and range of the spherical attachment, and consequently the auxiliary measuring instrument, can be determined (by the surveying device) by image evaluation of a camera image of the 2D code and on the basis of stored decoding information, for example in a memory of the surveying device. Together with a measured direction with respect to the auxiliary measuring instrument, the distance gives the position of the auxiliary measuring instrument in space or in relation to the surveying device, so that altogether the location (orientation and position, six degrees of freedom) of the auxiliary measuring instrument can be determined on the basis of the body.

Moreover, the auxiliary measuring instrument has a man-machine interface.

Moreover, the auxiliary measuring instrument is designed in a pen-like form and size, wherein an object point to be surveyed or marked out can be aimed at in a one-handed manner with a first end of the auxiliary measuring instrument.

Preferably, the auxiliary measuring instrument can be ergonomically held and guided with one hand, in particular for which the main body has indentations and/or bulges adapted to the human hand, in particular a gripping region for at least the thumb and index finger, and in particular also the middle finger, of a user, and/or the mass distribution of the auxiliary measuring instrument is adapted in such a way that its centroid satisfies ergonomic aspects.

Optionally, the auxiliary measuring instrument has an inertial measuring unit (IMU), so that the location of the auxiliary measuring instrument can be completely determined by a combination of measurement data of the inertial measuring unit and position data determined on the basis of the body.

As a further option, the first end is designed as a probe ball with electronic and/or mechanical correction of the measuring offset on the basis of the size of the probe ball. In this case, the correction preferably takes place by the probe ball being attached in such a way that, for measuring an object point, the probe ball is deflected exactly about the radius of the probe ball.

Optionally, the first end is designed as a self-triggering sensor tip, which on contact automatically triggers a measurement. Optionally, the end is exchangeable, in that the main body has a holder (connecting piece), which is intended for receiving different tool and/or sensor tips, in particular wherein the holder has a sensor system, which serves for automatically identifying the respective tip. Optionally, in the course of the identification, an identification of the length of the tip takes place, i.e. the measuring system is automatically notified of the measuring or marking point of the tip.

As a further option, the tool and/or sensor tip is designed as a marking pen, in particular a felt pen, pencil or crayon, and/or an active tool tip, in particular a printer and/or a sprayer and/or a marking laser, in particular a line laser, and/or is designed as a sensor tip, in particular a (touch) probe and/or a metal detector, a line finder (for example with a function for the active modulation of a signal onto the line) and/or a laser distance meter.

Optionally, the man-machine interface has a touch-sensitive display and/or a scroll wheel and/or a microphone (for voice control) and/or a lighting means for visual user information and/or a button. Such a button is optionally designed as a triggering button that is separately formed and/or separately arranged on the main body, wherein the triggering button is intended for triggering the position and orientation measurement of the auxiliary measuring instrument and/or the auxiliary measuring instrument has an active tool tip and/or sensor tip and the triggering button is intended for triggering an action of the tool tip (for example marking) and/or a measurement with the sensor tip.

As a further option, the auxiliary measuring instrument has a, in particular removable, measuring tape of variable length, in particular with an arresting function, wherein the measuring tape is intended for circular constructions, in particular so that the center point of the circle lies on the longitudinal axis.

In a development, the at least one element intended for the position and orientation measurement is designed as a sphere attachment, which bears on its surface a two-dimensional code, which can be bijectively evaluated by image processing of an image recorded with a camera of the surveying device.

Optionally, the length of the auxiliary measuring instrument is variable in a defined manner, in particular in that the main body has at its one end, defined by the longitudinal axis, a holder for receiving pole-shaped extension pieces, in particular wherein the holder has a sensor system which serves for the automatic identification of the respective extension piece, and/or the main body is telescopically designed, so that its length is variable, in particular steplessly, wherein the respectively applicable length can be measured by means of a position encoder of the auxiliary measuring instrument or an integrated electronic distance meter, which is for example arranged in an inner cavity.

As a further option, the auxiliary measuring instrument has a communications interface, in particular an IRDA or BLT interface, in order thereby to communicate with the surveying device.

The invention also relates to a ground-based surveying system with a, in particular stationary, surveying device having range-and-direction measuring functionality, in particular a total station, and a pen-like auxiliary measuring instrument as described above.

Optionally, the surveying device of the system has a base, a targeting unit, in particular a telescopic sight, which defines a target direction and can be pivoted with respect to the base about at least one axis, in particular two axes orthogonal to one another, in particular wherein the unit has a beam source for generating a measuring radiation and also an optical unit for directionally emitting the measuring radiation as a free beam, at least one angle meter and also an angle-measuring functionality for measuring the target direction, and a controller with single-point determining functionality, in the execution of which, controlled by the controller, a position of an object point designated with the aid of the auxiliary measuring instrument within an area of terrain is determined.

The invention also relates to a method for determining the position and/or marking a terrain point with the steps of aiming at the object point with a pen-like auxiliary measuring instrument as described above, determining the position and orientation of the auxiliary measuring instrument during the aiming at the object point by means of a ground-based surveying device, in particular a total station, determining the position and/or marking the object point (marking and/or surveying), starting from a known position of the surveying device, on the basis of the determined position and orientation of the auxiliary measuring instrument.

Optionally, in the course of the method, a continuous determination of the position and orientation of the auxiliary measuring instrument is performed (tracking) and, on reaching a predefined position and orientation, the marking of the object point is automatically triggered, that is to say that, when the object point to be achieved is passed over, the point is automatically marked.

The present invention also includes a computer program product or a computer data signal, which is embodied by an electromagnetic wave, with program code, for controlling or carrying out such a method for determining the position of a terrain point with the aid of such a pen-like auxiliary measuring instrument, in particular when the program is executed in a controlling and evaluating unit of a surveying system according to the invention.

A further aspect of the invention relates to a laser receiver for capturing a laser beam or laser light representing a position reference, for purposes of constructional activities or in the field of construction sites, with a housing with a front surface and a rear surface, wherein the front surface has a line- or area-like laser detector for the detection of the laser light and the rear surface is designed in such a way that the laser receiver can be displaced along a large-area object surface and so as to follow the profile of the object surface. The object surface is preferably a surface of a building, or similar at least partly planar surfaces that are already known, for example already known on the basis of a plan of a building or other construction/design plan or model.

The laser receiver also has a marker, in particular a printer, wherein the marker is designed and arranged in such a way that, in the state in which it is placed on the object surface, a physical marking can be applied to the object surface in a marking zone. Furthermore, the laser receiver has a controller, which is designed in such a way that, on the basis of the position reference given by the captured laser light, a marking can be automatically applied by means of the marker to the object surface positionally accurately at a planned or intended position, stored in an electronic memory, as soon as the planned position arrives in the marking zone, for example in that the laser receiver at least approximately reaches or passes over the planned location.

Optionally, the marker has a line-like or area-like marking region and/or is designed as an inkjet printer and/or for printing texts and/or graphics onto the object surface. Such graphics are for example 2D, 3D barcodes or QR codes, which serve for example for the injective identification of measuring points. As a further option, the marker is suitable for printing on ceilings (printing direction "upward", against the force of gravity) and/or additionally designed for applying a sealing of the marking, for example by means of a clear varnish or a protective film.

As a further option, the planned position is stored as part of a construction plan, such as for example a plan of a building.

As a further option, the laser receiver is designed for manual displacement, in particular in that it has a shaping of the housing that can be held by a hand and/or a continuation attached to the housing that can be held by a hand.

In a development, the laser receiver has at least one position encoder for the continuous determination of the position and/or orientation of the laser receiver, in particular wherein the controller is designed in such a way that regions in which no position referencing by means of the laser light is possible can be bridged by means of position data of the position encoder and/or the position encoder is designed as a target that can be measured by a surveying device, in particular a retroreflector, and/or at least three lighting means which are arranged in a defined manner on the housing and can be captured in an image by a camera, and/or an inertial measuring unit, for example with acceleration sensors and rate-of-rotation sensors, and/or optical or mechanical linear encoders.

Optionally, the rear surface has wheels and/or caterpillars for displacing the laser receiver. As a further option, the laser receiver has a cleaning device for cleaning the object surface, in particular has a device for spraying compressed air and/or solvent and/or a drive for independent displacement.

The invention also relates to a mobile construction site printer for automatically printing construction site markings onto planar surfaces, in particular surfaces of a building, in the course of construction work or similar construction-related work over a large area, for example when erecting or converting buildings or parts of a building, for example also assembly and disassembly work in trade fair halls, or on other objects of a large area, such as ships or aircraft. The printer has a printing zone; the printer is designed in such a way that it can be moved by a user by hand along the object surface and so as to follow the profile of the object surface, wherein the movement along the object surface has the effect that the translation with respect to one direction and the rotation with respect to two axes are predefined. The printer has at least one position encoder, for example a yaw-angle sensor in combination with an inclination sensor, whereby the position with respect to the two remaining translational degrees of freedom and the one remaining rotational degree of freedom of the printer can be continuously determined. Furthermore, the printer has a controller, which is designed in such a way that the (continuously determined) position of the printer can be continuously compared with a planned position on the object surface, stored in an electronic memory, so that a construction-site marking can be automatically printed positionally accurately at the stored planned position onto the object surface uninterruptedly during the movement as soon as the planned position arrives in the printing zone, that is to say for example the printer at least approximately passes over the planned position in the course of the movement.

The invention also relates to a mobile construction-site printer for automatically printing construction-site markings on object surfaces in the course of construction work, wherein the printer has a printing zone, the printed can be moved in a mobile manner along an object surface, the printer has at least one position encoder, so that the location and alignment of the printer in relation to the object surface can be completely determined, and the printer has a controller, which is designed in such a way that the location and alignment of the printer can be continuously compared with respect to a planned position on the object surface, stored in an electronic memory, so that a construction-site marking can be automatically printed positionally accurately at the stored planned position onto the object surface uninterruptedly during the movement as soon as the planned position arrives in the printing zone.

The developments described above of the laser receiver according to the invention can also be applied correspondingly to a respective mobile construction-site printer according to the invention.

The invention also relates to a method for physically marking a planned position, stored in an electronic memory, in particular as part of a plan of a building, on an object surface for purposes of constructional activities, with the steps of providing a position reference by means of free-beam laser light, displacing a laser receiver having a marker, in particular a printer, on the object surface, capturing the laser light representing a position reference by means of the laser receiver, electronically controlled automatic positionally accurate physical marking of the planned position, retrieved from the memory, on the object surface during the displacement on the basis of the position reference given by the captured laser light as soon as the laser receiver is at least approximately brought over the planned position.

The invention also relates to a method for marking a planned position, stored in an electronic memory, in particular as part of a plan of a building, on an object surface for purposes of constructional activities, with the steps of moving a mobile construction-site printer along the object surface, wherein the position, and optionally also the orientation or alignment, of the printer is continuously determined, automatically continuously comparing the respective position with the planned position, stored in the electronic memory, on the object surface, automatically positionally accurately printing a marking at the planned position on the object surface during the movement as soon as the laser receiver has at least approximately passed over the planned position, in particular wherein an interruption of the movement is not required for the printing.

Optionally, in the course of these methods, in addition to the position marking, meta data stored in an electronic memory are retrieved and a representation reproducing the meta data, in particular a text and/or a graphic, is applied to the object surface by means of the marker or printer during the position marking.

Optionally, before the marking, a cleaning of the object surface is performed at the planned position by means of the laser receiver or the mobile printer. As a further option, after the marking, the application of a protective layer to the marking is performed, for example the application of a protective coat or film.

The present invention also includes a computer program product or a computer data signal, which is embodied by an electromagnetic wave, with program code, for controlling or carrying out such a marking or printing process for applying a marking to an object surface.

A further aspect of the invention relates to a method for surveying and/or marking points on an object on the basis of planned positions for purposes of constructional activities, with the steps of setting up a stationary surveying device at a first known positioning in a surrounding area of the object, wherein the surveying device has a base, a targeting unit, in particular a telescopic sight, which defines a target direction and can be pivoted with respect to the base about at least one axis, in particular two axes orthogonal to one another, a beam source, in particular a laser source, for generating radiation and also an optical unit for emitting the radiation as a free beam in the target direction, wherein the free beam serves for surveying and/or marking object points, and in particular a range meter and also a range-measuring functionality for measuring a range from the target in the target direction, at least one angle meter and also an angle-measuring functionality for measuring the target direction, and a controller with single-point determining functionality, and also a memory, in which input or surveyed positions can be stored, in particular as part of a plan of a building or room.

Also performed in the course of the method are the steps of retrieving from the memory a set of object points of the object to be surveyed and/or to be marked, surveying and/or marking from the first positioning object points of the set of object points that can be surveyed and/or can be marked from the first positioning by means of the free beam, on the basis of the target direction, ascertaining missing object points of the set of object points, relocating the surveying device to a second, unknown positioning in the surrounding area of the object, automatically determining the second positioning by the surveying device on the basis of the knowledge of the first positioning, so that the second positioning is known, and surveying and/or marking missing object points by means of the free beam from the second positioning.

As an option, before the relocation, a positioning proposal suitable for the second positioning is at least approximately ascertained by the controller of the surveying device, on the basis of stored positions, and the positioning proposal is displayed to a user on a display.

Optionally serving as a criterion by which the positioning proposal is calculated is a calculated (theoretical) angle of incidence of the free beam on the object surface that contains an object point still to be surveyed. For such surveying or marking operations, perpendicular incidence is optimum. For this reason, a positioning that allows perpendicular incidence, or at least incidence that is as perpendicular as possible, is sought, either for a respective or the most important object point to be achieved or for a set of object points, then for example in the form of an optimum for the mean value of all the angles of incidence of all the object points of the set.

As a further option, information concerning a target direction in relation to at least one of the positions that cannot be marked is taken into account in the ascertainment of the positioning proposal.

Optionally, the display of the positioning proposal takes place is performed in a graphic form, in particular embedded in a visualization of a plan of a building or room or embedded in a 2D or 3D panoramic image, recorded in situ, of the surrounding area and/or as an augmented reality representation in a live video image of the surrounding area, for example displayed on AR glasses.

In a development of the method, the automatic determination of the second positioning is performed on the basis of a depiction of the surrounding area produced by the surveying device in the second positioning, in particular wherein the depiction of the surrounding area is produced by means of a camera image of the surveying device and/or a laser scan carried out by means of the free beam. Optionally, in the course of the automatic determination of the second positioning, the depiction of the surrounding area of the second positioning is compared with a depiction of the surrounding area produced in the first positioning, in particular wherein positions that can be seen in both depictions of the surrounding area and are marked from the first positioning serve as a position reference and/or are compared with a stored digital plan of a building or room.

As an alternative or in addition, the automatic determination of the second positioning is performed by means of a structure-from-motion algorithm on the basis of measurement data of an inertial measurement unit of the surveying device and/or a series of camera images recorded with the surveying device.

The present invention also includes a computer program product or a computer data signal, which is embodied by an electromagnetic wave, with program code, for controlling or carrying out such a method for surveying and/or marking points on an object on the basis of planned positions for purposes of constructional activities.

Some aspects of the invention also relate to a stationary surveying device for surveying and/or optically marking points on an object on the basis of planned positions for purposes of constructional activities, wherein the surveying device has a base, a targeting unit, in particular a telescopic sight, which defines a target direction and can be pivoted with respect to the base about at least one axis, in particular two axes orthogonal to one another, a beam source, in particular a laser source, for generating radiation and also an optical unit for emitting the radiation as a free beam in the target direction, in particular a range meter and also a range-measuring functionality for measuring a range from the target in the target direction, and at least one angle meter and also an angle-measuring functionality for measuring the target direction. Furthermore, the device has a controller with single-point determining functionality and a memory, in which input or surveyed positions can be stored, in particular as part of a plan of a building or room, wherein the controller is designed for performing the method described above for surveying and/or marking points on an object on the basis of planned positions for purposes of constructional activities.

BRIEF DESCRIPTION OF THE DRAWINGS

The present invention is described in greater detail below on the basis of the embodiments and application procedures schematically represented in the drawings.

In the specific figures:

FIG. 9a-e show further embodiments of a pen-like auxiliary measuring instrument.

DETAILED DESCRIPTION

Figure 1:
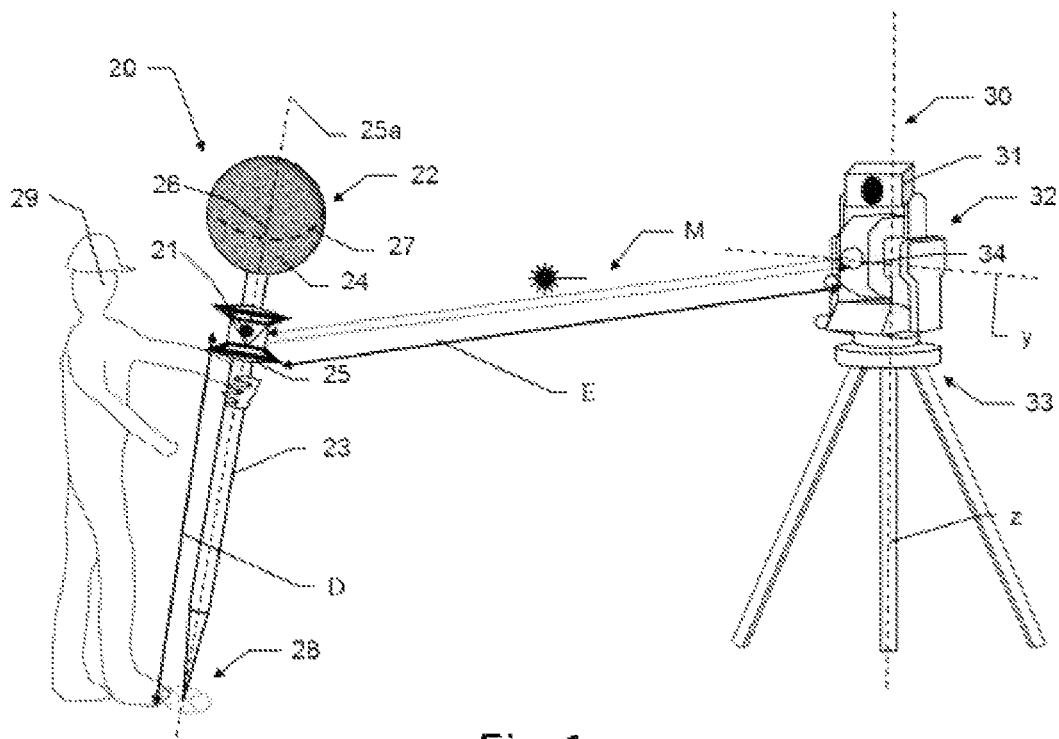
FIG. 1 shows an example of a surveying system with an auxiliary measuring instrument with spherical coding.

FIG. 1 shows purely schematically an example of a surveying system with an auxiliary measuring instrument with spherical coding. The system has an auxiliary measuring instrument 20, which can be carried by a user and is designed as a plumbing pole. The instrument 20 has an elongate body 23 with a longitudinal axis 25a. The plumbing pole 20 or the longitudinal axis can be handily aligned by a user 29 with a terrain point 28 to be surveyed or to be marked out, so that the auxiliary measuring instrument 20 can be used to aim at the terrain point 28. Such a terrain point 28 is in this case located for example outdoors or within a building. The distance D from a reference point 21 of the plumbing pole 20 to the terrain point 28 is in this case already known and stored in a memory of the surveying system. As an alternative to the representation shown, there are also known auxiliary measuring instruments 20 that aim at the terrain point 28 contactlessly, for example by means of a laser distance meter, and measure the then variable distance from the reference point 21 to the terrain point 28 and pass it on to a memory or an evaluation.

The surveying system also has a surveying device 30, for example a total station. The surveying device 30 has a base 33 and an attachment 32, which is arranged on the base 33 pivotably in relation to the latter with reference to a vertical axis z. The mount 33 has a targeting unit 34, which is rotatable with respect to a horizontal axis y. Consequently, the alignment of the targeting unit 34 or the target direction can be varied by rotation about the two axes z and y, wherein the respectively applicable alignment is measured by angle encoders.

The targeting unit 34 includes a light source, for example a laser, which generates measuring radiation which is emitted with the aid of a corresponding optical unit as a measuring beam M, for example as a laser beam, directed onto the auxiliary measuring instrument 20, or to be more precise onto a target 25 of the auxiliary measuring instrument. The target 25 is in this case in a known spatial relationship with the reference point 21, in the example because the center of the target 35 coincides with the reference point 21. On the basis of the measuring radiation, the range E from the total station to the auxiliary measuring instrument 20 or to the reference point 21 is determined, for example with the aid of a transit time of measuring beam pulses and/or by the interferometric principle. Usually, the emitted light is in this case retroreflected by the target 25, so that it can be received by the surveying device 30 and can be detected by means of a detector.

From knowledge of the direction of emission, the range E and the distance D, the position of the terrain point 28 in relation to the surveying device 30 (or to be more precise in relation to a reference point of the surveying device 30) can consequently be determined. If the position of the surveying device 30 with reference to an external coordinate system is known, the position of the terrain point 28 in this coordinate system can consequently also be determined. In the case of a geodetic survey, the coordinate system is for example the UTM coordinate system.

Apart from the variables mentioned, knowledge of the alignment and inclination of the auxiliary measuring instrument 20 (in relation to the surveying device 30 or with reference to the coordinate system) is also necessary however for the injective determination of the position of the terrain point. This can be achieved by the plumbing pole 20 always being positioned perpendicularly on the terrain point 28, so that the orientation is already known. This predetermined attitude of the auxiliary measuring instrument 20 is not always possible, however, for example when corners of a building are used as the terrain point 28, or at least can scarcely be maintained exactly by the user 29, especially—but not only—when a contactlessly operating auxiliary measuring instrument 20 is concerned.

For this reason, the auxiliary measuring instrument 20 has an attachment 22, with the aid of which the orientation of the auxiliary measuring instrument 20, i.e. inclination, roll and yaw or azimuth angle, can be determined. The attachment 22 has the form of a sphere, which is arranged on the body 23 in a known spatial reference relationship with the longitudinal axis 25a, in the example in that the center 26 of the sphere lies on the longitudinal axis 25a, whereby the longitudinal axis 25a can be regarded as a North-South axis of the sphere, and consequently an equator 27 of the sphere is predefined.

An optical, two-dimensional code 24 is arranged in a distributed manner on the surface of the sphere. An image of the sphere 22 or the code on its surface is recorded by means of a camera 31, arranged in a defined manner, of the surveying device 30 (as an alternative to the representation shown in FIG. 1, the camera 31 may for example also be designed as an on-axis camera, that is to say without any offset in relation to the optical axis of the targeting unit 34). The code 24 is designed in such a way that, by means of image evaluation of the camera image, the orientation of the sphere 22, and consequently of the surveying pole 20 in relation to the camera 31 and consequently in relation to the surveying device 30, can be bijectively ascertained. That is to say that the inclination of the longitudinal axis 25a and its alignment (rotating position of the auxiliary measuring instrument 20 about the longitudinal axis 25a) are bijectively determined on the basis of a code (segment) visible from the surveying device 30 by means of image evaluation/processing.

The code 24 runs around the surface, at least in a plane running perpendicularly to the longitudinal axis 25a and through the sphere center point 26, so that code 24 can be seen, and consequently the orientation can be bijectively determined, from any side view. In the example, the code 24 is even formed in a distributed manner over the entire surface of the sphere and in such a way that, in any location (apart for example from instances where it is covered by the main body) of the auxiliary measuring instrument 20, this location can be determined. As an alternative, for example, an upper region and a lower region of the sphere are code-free or the sphere 22 is cut off at the top and bottom (i.e. the two "polar caps" of the sphere 22 are not printed with code or are not present at all), on the assumption that extreme inclinations of the auxiliary measuring instrument 20 or the longitudinal axis 25a, for example by more than 60° with respect to the vertical z, on the assumption that do not occur in the application intended for the auxiliary measuring instrument 20 or surveying system concerned, and therefore do not have to be determinable.

As an option (that is not represented), the pole 20 additionally has a light for illuminating the attachment 22, so that the attachment 22, or to be more precise the code 24, can be seen sufficiently well in the camera image even in poor outside light conditions. For this, the sphere 22 is designed for example as a translucent hollow body, in the interior of which there is a light source, so that the surface of the sphere is illuminated from the inside.

As a further option, the sphere attachment 22 additionally serves as a protective body for absorbing impact on the auxiliary measuring instrument 20. For this purpose, the sphere 22 is positioned, for example as shown in FIG. 1, at the upper end of the pole 20 and is of such a large diameter that, if the plumbing pole 20 falls over from the upright position, the pole 20 hits the ground with the sphere 22, which is for example produced from an elastic or otherwise unbreakable material or at least has a protective layer of such material. The remaining parts of the auxiliary measuring instrument 20 are consequently protected by the sphere 22 from such mechanical damage.

As an additional option, the target 25 is integrated in the attachment 22. For example, retroreflective elements (for example in the form of a retroreflective film or layer or individual retroreflectors that are distributed segmentally in a way similar to in the case of a soccer ball), which perform the function of the retroreflector 25, are distributed over the surface of the sphere. As a further alternative, direction and range determination are performed for example in an image-based manner, in that the sphere attachment 22 or the code 24 serves not only for orientation determination, but also for position determination, and consequently as a target 25. For this purpose, the range is ascertained, for example on the basis of the size of the sphere 22 and/or of the code in the image in comparison with the known actual size, and the direction is ascertained on the basis of the position of the sphere 22 and/or of the code in the image. The code is either the same code that also codes the orientation, that is to say therefore performs a dual function, or an additional code serving purely for position coding.

FIGS. 2a-2d show an example of an image evaluating operation of a camera image 35, which has been recorded by the camera of the surveying device. Depicted in the image 35 is part of the auxiliary measuring instrument, including the sphere attachment 22 (see FIG. 2a).

Figure 2A:
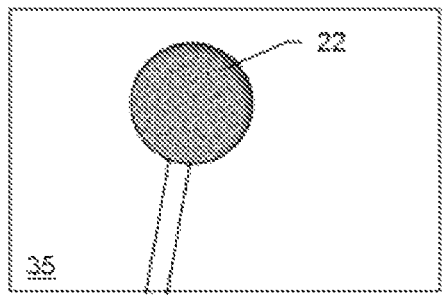
FIG. 2a-d show an example of an image evaluating operation with respect to decoding.
Figure 2B:
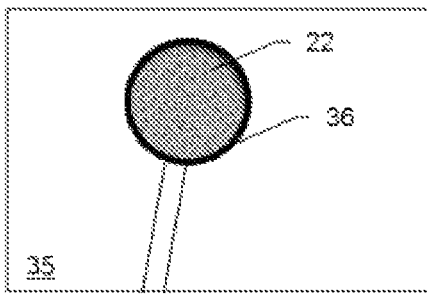

Thus, in the image a circle geometry 36 is adapted ("fitted") as well as possible to the depicted circular form of the sphere 22 by means of an algorithm known per se, as indicated in FIG. 2b.

Figure 2C:
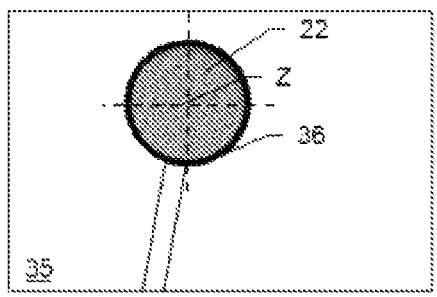

In FIG. 2c it is shown how the center Z of the depicted attached sphere 22 is determined on the basis of the known center point of the circle geometry 36.

A region or segment 37 of the image 35 or of the depicted surface of the sphere 22 that is situated at the center Z or represents a central segment of the imaging depicting the surface of the sphere (see FIG. 2d) is then used for the actual code evaluation or decoding.

In other words, in the image the silhouette of the sphere in the image is determined and at its centroid a region of interest (RoI) is ascertained and used for the decoding, and consequently orientation determination. Concentration on or restriction to a segment 37 of the code arranged at the center Z of the depicted image has the advantage that the influence of distortions of the three-dimensional surface of the sphere in the two-dimensional camera image 35 is consequently kept as small as possible, in particular to the extent that it is negligible and does not have to be taken into account in the decoding. That is to say that the segment 37 is chosen such that on the one hand sufficient code for the bijective determination of the location of the sphere in relation to the camera or the total station is visible/available in the segment 37, on the other hand the image evaluation does not have to differ from an evaluation of a code that is arranged on a plane which is located perpendicularly to the recording direction or parallel to the image plane.

As an option, a determination of the location of the center Z in the image or the deviation of the location from a desired position is performed, for example from the center of the image. On the basis of this offset, the target direction of the surveying device is then tracked, so that the center Z comes to the desired position. This allows an exact alignment of the target direction or, in the case of a moving auxiliary measuring instrument, tracking of the target.

Figure 2D:
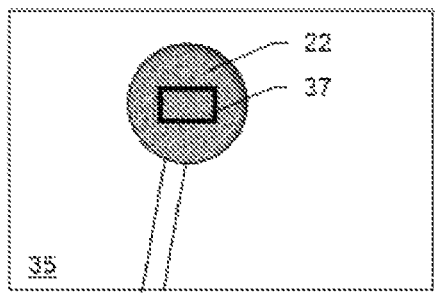
Figure 3:
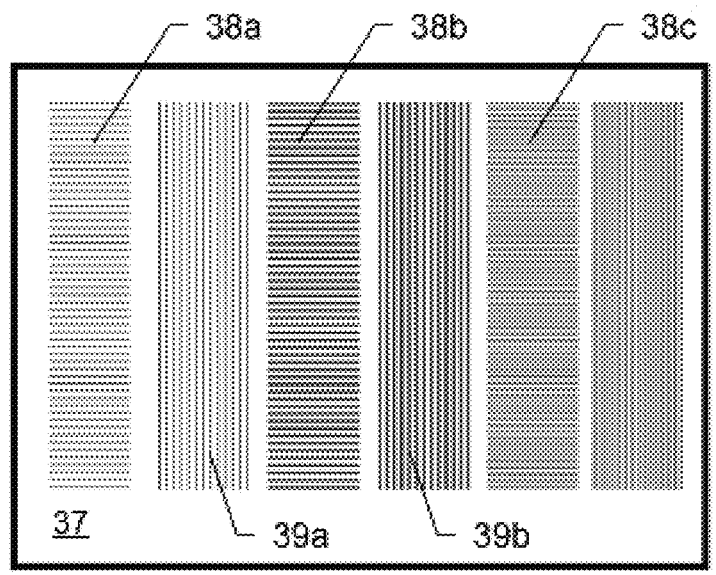
FIG. 3 shows an example of an embodiment of a coding, FIG. 4a,b show an example of a surveying system with calotte measuring functionality, FIG. 5a,b show examples of methods for position determination by means of producing a calotte.

FIG. 3 shows purely schematically an example of a code on the basis of which the orientation of the sphere attachment, and consequently the auxiliary measuring instrument, can be bijectively determined in a segment 37 (cf. FIG. 2d). In the example, the code is of two parts, in such a way that it has first code elements 38a-38c, which serve for the bijective coding of a first direction, for example the length (with respect to the equator 27 from FIG. 1). Furthermore, there are second code elements 39a-39c, which bijectively code the width as a second direction. By decoding the two code parts 38, 39, it is consequently specified bijectively which "location" on the sphere can be seen in the segment 37, and consequently the orientation of the sphere in relation to the image (segment).

In the example, the code is in this case of such a form that in principle already a respective element 38a, 38b or 38c or 39a, 39b, 39c alone bijectively codes the length or width. The presence of in each case three code elements 38a-c, 39a-c that is shown serves for providing various resolution stages, so that similar resolutions can be ascertained from different ranges between the camera and the sphere, and consequently there is the same accuracy of the orientation determination over all measuring ranges. For example, a respective element 38a and 39a with a comparatively coarse structure serves for great ranges, a respective element 38b and 39b with medium resolution serves for medium ranges and a respective element 38c and 39c with a fine structure serves for small ranges or measurements in the near range. Consequently, such a code is also suitable for use with surveying devices with zoom-free cameras.

As an alternative or in addition, such a code division with finer and coarser code elements serves for increasing the robustness of the measurement by providing redundancy and/or providing coarse (medium) and fine resolution. For example, in a first step a coarse, bijective length is determined on the basis of the code strip 38a and in a second step is refined by the code strip 38b and/or 38c, for which the code strips 38b and/or 38c do not have to code bijectively.

The code elements 38, 39 for the coding of two different directions may differ by different geometries, as indicated in the example. As an alternative or in addition, they differ by different colors, for example in that the length coding 38 is in green and the width coding 39 is in red. Such different colors (as a difference from the representation shown) also facilitate for example a superposed arrangement of code elements, so that the limited space of the surface of the sphere can be covered more densely.

Figure 4A:
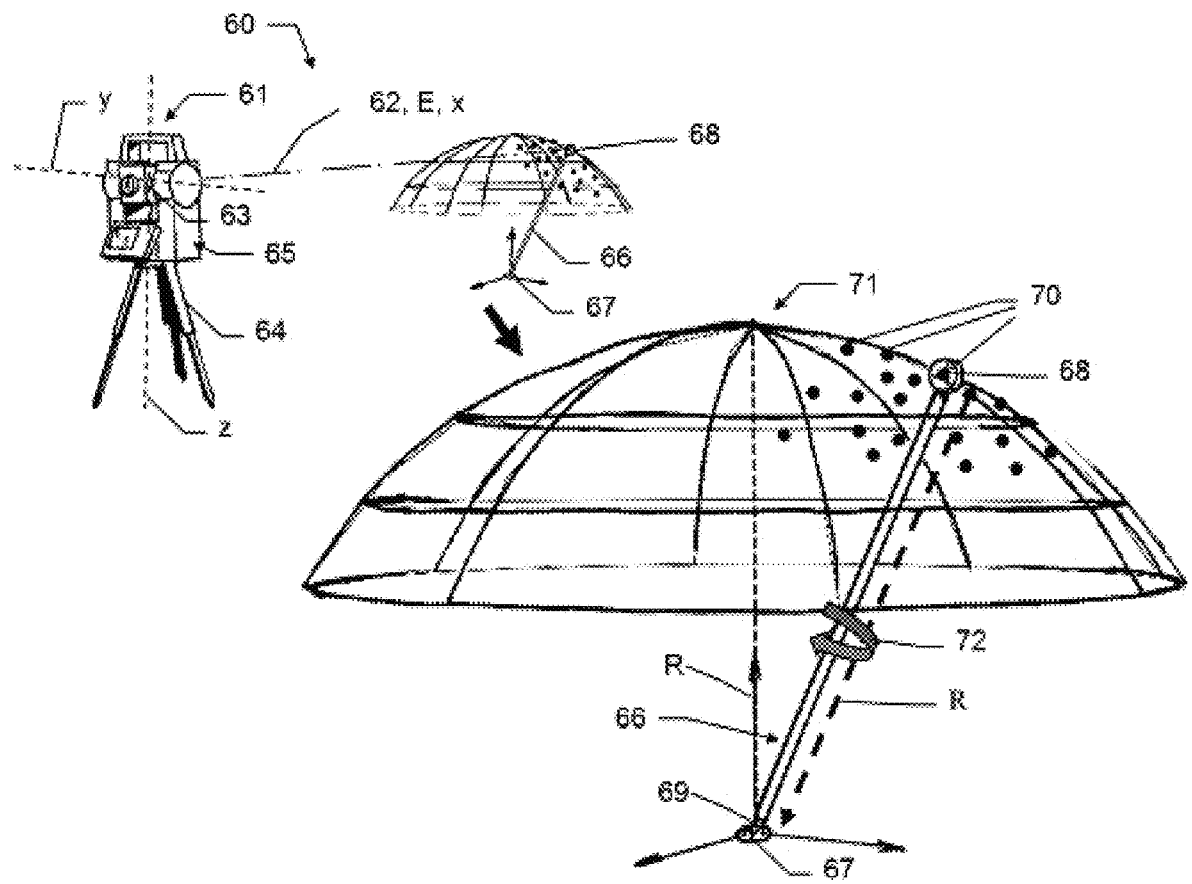

FIG. 4a schematically shows an example of a surveying system 60, which has a callotte measuring functionality. The surveying system 60 has a surveying device 61, designed for example a total station, and an auxiliary measuring instrument 66, which can be optically aimed at by the surveying device 60 and is designed for example as a plumbing pole with a retroreflector. The surveying device 61 has a base 64 and also an upper part 65, which is arranged on the base 64 and is rotatable in relation to the base 64 about an axis z. The upper part 65 in turn has a defined tilting axis y, about which the targeting unit 63 can be pivoted. The targeting unit 63 is for example designed as a telescopic sight. The targeting device 63 defines a target direction x, which can be varied by pivoting about the two axes z, y. For determining the respectively applicable target direction y, the surveying device has at least one angle meter, for example to establish the rotational position about the axes y and z.

The auxiliary measuring instrument 66 of the surveying system 60 has a target 68, which can be aimed at by the surveying device 61 by means of the targeting device 63, and moreover a range E (in target direction x) can be measured by means of a range meter of the surveying device 61. In the example, for this purpose a measuring beam 62 is emitted by the surveying device 61 in target direction x, retroreflected by the target 68, the beamed-back measuring beam 62 is detected by the surveying device 61 and the range E is determined, for example by means of the Fizeau principle, transit-time measurement or interferometrically. Known from the prior art are for example alternative image-based target-position determining methods, in which the target 68 has specific features, with the aid of which the range and orientation of the target 68 can be measured on the basis of an image of the target 68 that is recorded by a camera of the surveying device 61 (i.e. the camera together with a corresponding image-evaluating algorithm forms the range meter). Further alternatives are for example stereometry or range images. Knowledge of the range E and the target direction x can consequently be used in any event for determining the position of the target 68 in relation to the surveying device 61 and, with a known absolute position of the surveying device 61, also the absolute position of the target 68.

The target position in turn serves for determining the position of a terrain point 67, which is to be surveyed for example in the course of geodetic surveys or in the course of construction activities. To be able to obtain an injective inference of the position of the terrain point 67 from the target position, the target 68 must be in an injective relative position in relation to the terrain point 67.

This is achieved in surveying systems 60 or surveying methods known from the prior art by the target 68 attached to the auxiliary measuring instrument 66 being at the defined, known distance from the end of the auxiliary measuring instrument 66 that contacts the terrain point 67, and consequently also at a known distance from the terrain point 67. Furthermore, the auxiliary measuring instrument 66 is set up perpendicularly on the terrain point 67, so that the target 68 is perpendicularly above the terrain point 67. As a result, the target position and the terrain point position are injectively linked. A disadvantage of this method is that a perpendicular alignment cannot be easily maintained and is even not always possible, for example because the terrain point 67 is an inner or outer corner of a building.

According to the invention, this disadvantage is overcome by the surveying system 60 having a callotte measuring functionality, as explained in greater detail below on the basis of the lower part of FIG. 4a. The auxiliary measuring instrument 66 is positioned with its contact end 69 on the terrain point 67. Without breaking the contact, i.e. the contact end 69 remains fixed on the terrain point 67, the auxiliary measuring instrument 66, and consequently the target 68 attached to its other end, is thus pivoted. The target 68 thereby assumes different target positions 70, which on account of the rigid connection to the terrain point 67, are all linked with the terrain point 67.

Figure 4B:
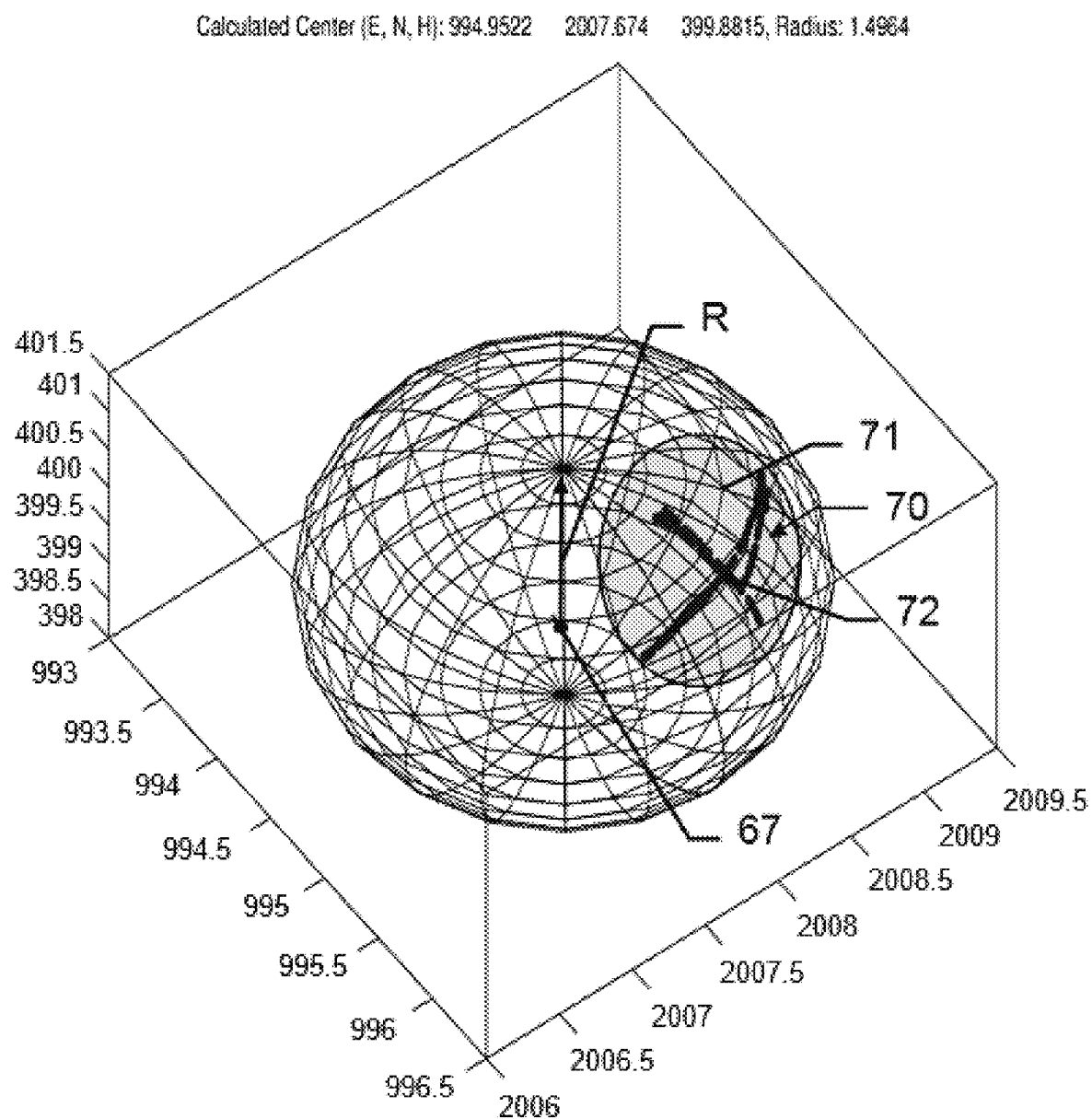

As illustrated in FIG. 4a and also in FIG. 4b, the pivoting movement 72 with the fixed distance R between the target 68 and the point 67, allows the target 68 to assume different target positions 70, which are not coplanar to one another and are all located on a surface of a sphere or segment of a surface of a sphere or calotte 71, the center point of which is the sought terrain point 67. Consequently, the sought position of the terrain point 67 can be determined from knowledge of the calotte 71.

For this purpose, either at least four or at least three of the different target positions 70 are determined by means of the surveying device 61 and used as a basis for calculating the calotte 71, for example by means of a best-fit algorithm for minimizing the squares of the distances of the target positions 70 in relation to the surface of the sphere. Generating the target positions 70 either takes place manually or automatically in the sense that an optionally present automatic target tracking, known in principle, of the surveying device 61 is used as part of the calotte measuring functionality, in order to change the target direction x automatically so as to follow the pivoting of the target 68 and thereby to continuously determine target positions or calotte points 70. The continuous determination of target positions is in this case performed for example at a previously predefined measuring rate, for example every tenth of a second, half a second or every second, or —possibly dynamically—adapted to a speed of the pivoting movement, measured for example on the basis of at least two measured target positions and their difference in time.

Three target positions 70 are in principle already sufficient for calculating the flattened dome calotte 71 if the distance R from the target 68 to the terrain point 67, that is to say the sphere radius R, is known, that is to say this distance or the height of the plumbing pole 66 is stored for example in a memory of an evaluating unit of the surveying system. On the basis of four instead of only three target positions 70, the flattened deme calotte or the sphere center point 67 can be injectively calculated even without knowledge of the distance or sphere radius R. A stored distance R is in such a case optionally used for increasing the robustness of the position determination or for verification, for example in that a sphere radius R ascertained on the basis of the at least four target positions 70 is compared with the stored distance in order to determine the extent of any deviations.

As a further option, such an extent of the deviation is in this case used as a measure for assessing the quality of the calotte or position calculation. The smaller the deviation, the better the quality. As an alternative or in addition, another type of overdetermination of the calotte is used to provide a measure of quality. If there are more than the three or four minimum target positions 70 with which the calotte 71 or the center point 67 has been calculated, the accuracy or quality of the calculated calotte 71 is ascertained on the basis of the "excess" target positions.

The assessment of the quality for example on the basis of a measure of quality is in this case performed automatically and/or by a user, as further explained on the basis of the following figures.

Figure 5A:
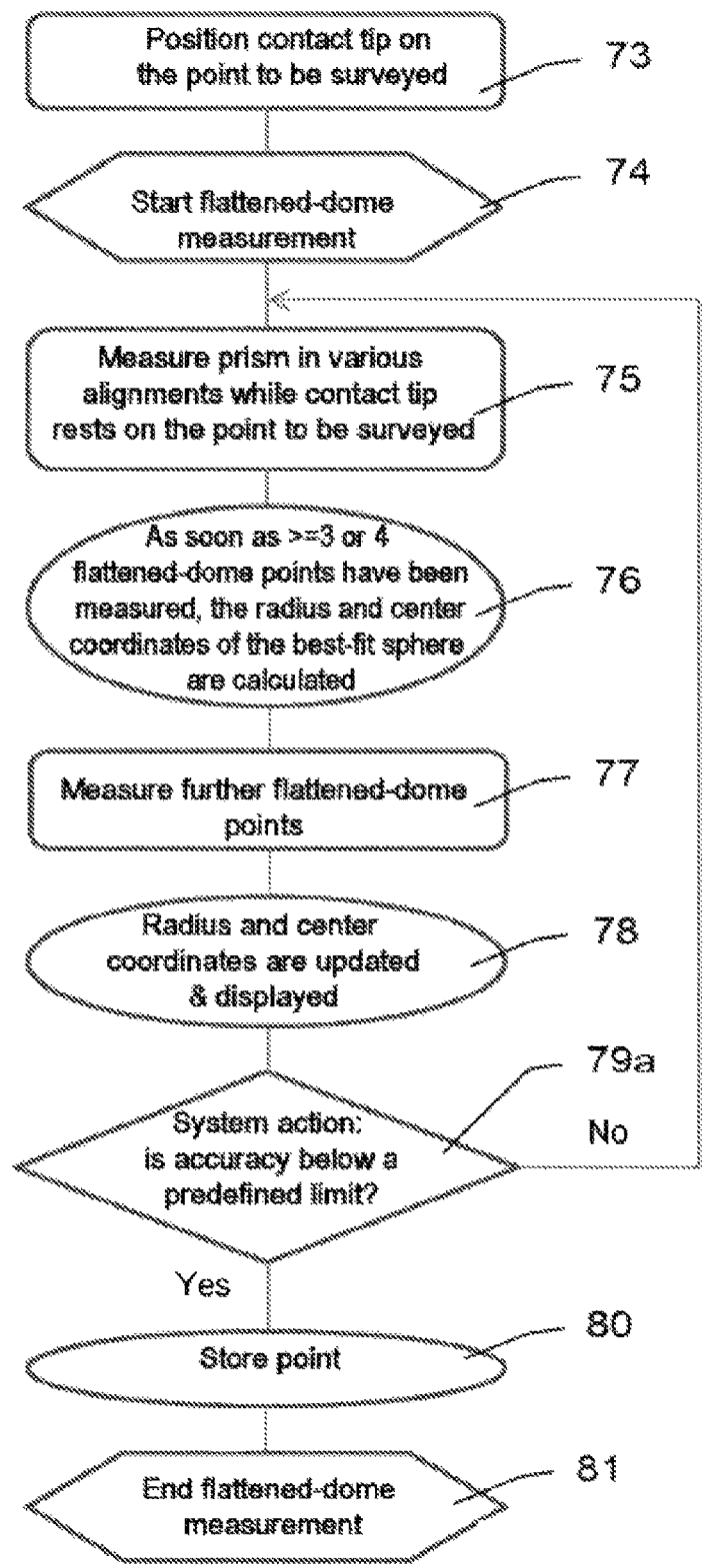

FIG. 5a shows a first example of a method for position determination by means of producing a calotte. In step 73, the contact end of the auxiliary measuring instrument is brought into physical contact with the terrain point. Subsequently, in step 74, the calotte measuring functionality is started. The auxiliary measuring instrument is pivoted about the terrain point and the target is thereby brought into various target positions, which are all at the same distance from the terrain point, and these target positions (calotte points) are determined with the aid of the surveying device (step 75).

As soon as at least four (or, when using the defined target height or pole length, at least three) calotte points have been produced, the radius and center point are calculated by the best-fit method (step 76) and further calotte points are generated by further movement of the target and further target position determination (step 77). On the basis of these further target positions, the radius and sphere center point are updated or refined and in the example are displayed on a display of the surveying system, for example in the form of a graphic (step 78). Consequently, in this variant the determination of target positions and calculation of the calotte take place simultaneously: as soon as the minimum number of for example four target positions are obtained, a calotte is calculated and this is continuously newly calculated or refined on the basis of the continuously supplied target positions. Optionally, the provisional calotte or the provisional sphere data is or are displayed, for example graphically, by a user display of the system, so that already during the calotte measuring operation the user obtains information concerning the measurement result and if applicable can assess this information and for example influence, adapt or terminate the measuring operation.

The surveying system then assesses in step 79a the accuracy or quality of the calculated calotte, for example on the basis of a measure of quality as mentioned above. If the accuracy is below a predetermined limit, that is to say there is sufficient quality, in step 80 the coordinates of the sphere center point or terrain point are permanently stored and the flattened-dome measurement is ended (step 81). Otherwise, the generation of target positions is continued. The calotte points or target positions that served for the calculation of the calottes, and consequently the terrain point position, are for example only kept in a temporary store for the method, and are not permanently stored but erased after final determination of the terrain point.

Figure 5B:
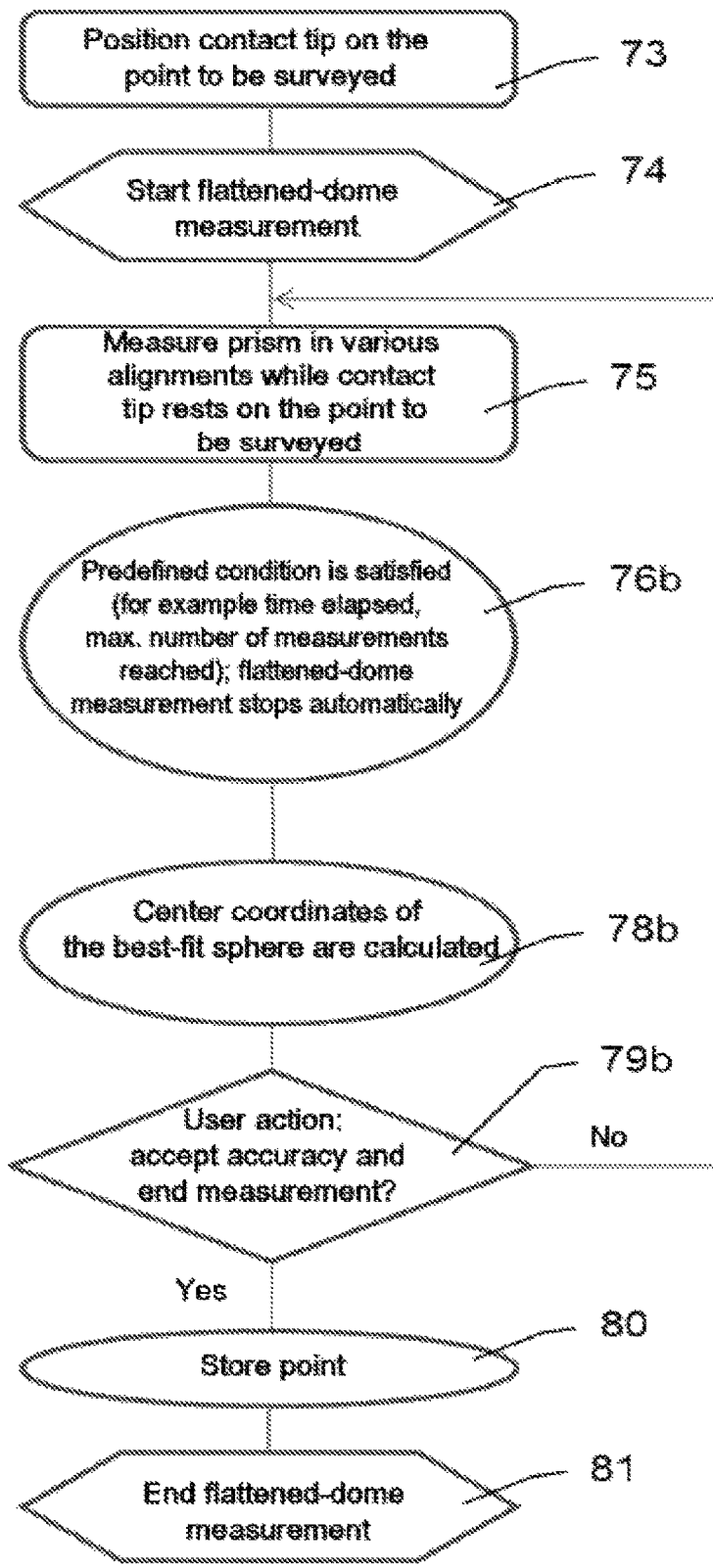

FIG. 5b represents a variation of the method according to FIG. 5a. As a difference from the foregoing, a check of the calotte or of the sphere center point, and if applicable the sphere radius, is performed by the user in a step 79b and it is decided by the user whether the terrain point position is exact or sharp enough or whether a further or renewed target position determination is performed in order to improve or newly calculate the sphere center point.

As a further difference from FIG. 5a, a calculation of the calotte or the sphere center point is only performed in a step 78b after the determination of target positions in a step 76b has been completed. As a criterion that serves for deciding on the ending of the target position determination, for example a time period and/or number of measured values is used. For example, it is stipulated that a set minimum measuring quality is to be achieved or a minimum number of ten target positions are to be determined or the measurement is ended after two minutes. Then, the calotte is calculated on the basis of these ten positions or the positions ascertained within the two minutes.

Figure 6:
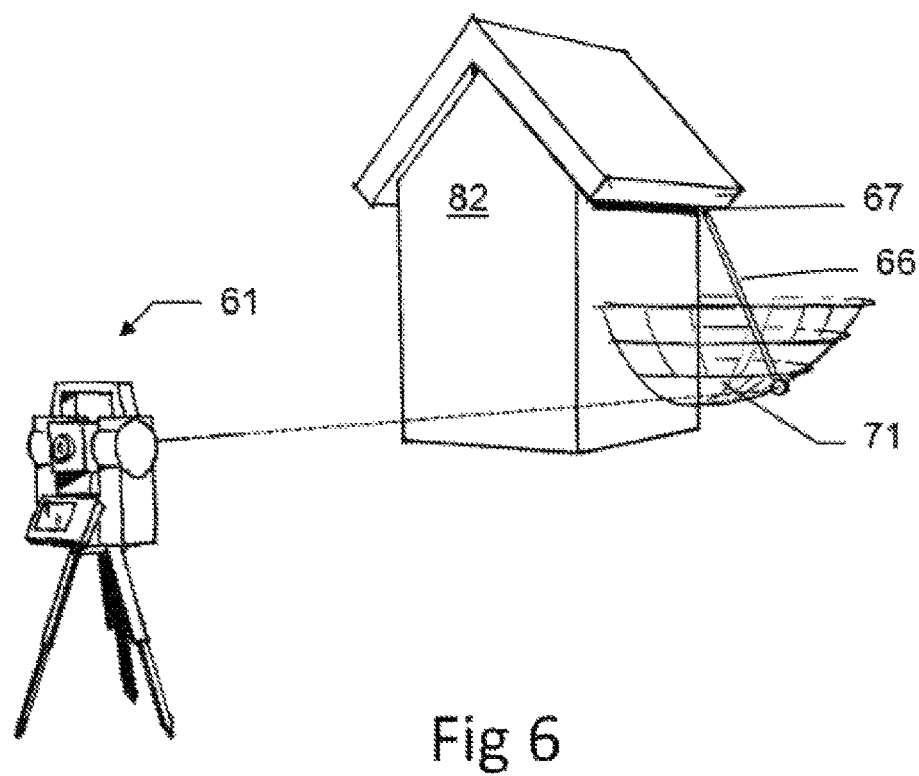
FIG. 6 shows an example of surveying with the aid of a calotte measuring functionality.

FIG. 6 shows an example of how a terrain point 67 that cannot be surveyed with conventional surveying systems, or only very laboriously, can be advangageously surveyed by means of the calotte measuring functionality. In the example, the terrain point 67 is a location of a building 82 at the interface of the roof and wall. It is not possible there for the surveying pole 66 to be set up perpendicularly, but contacting with its contact end and rotating movement with the point on the building as a fixed point as shown. Consequently, the three or four target positions necessary for the calculation of a calotte 71 can be generated, on the basis of which the sphere center point is calculated, whereby the sought position of the terrain point 67 is determined.

Figure 7A:
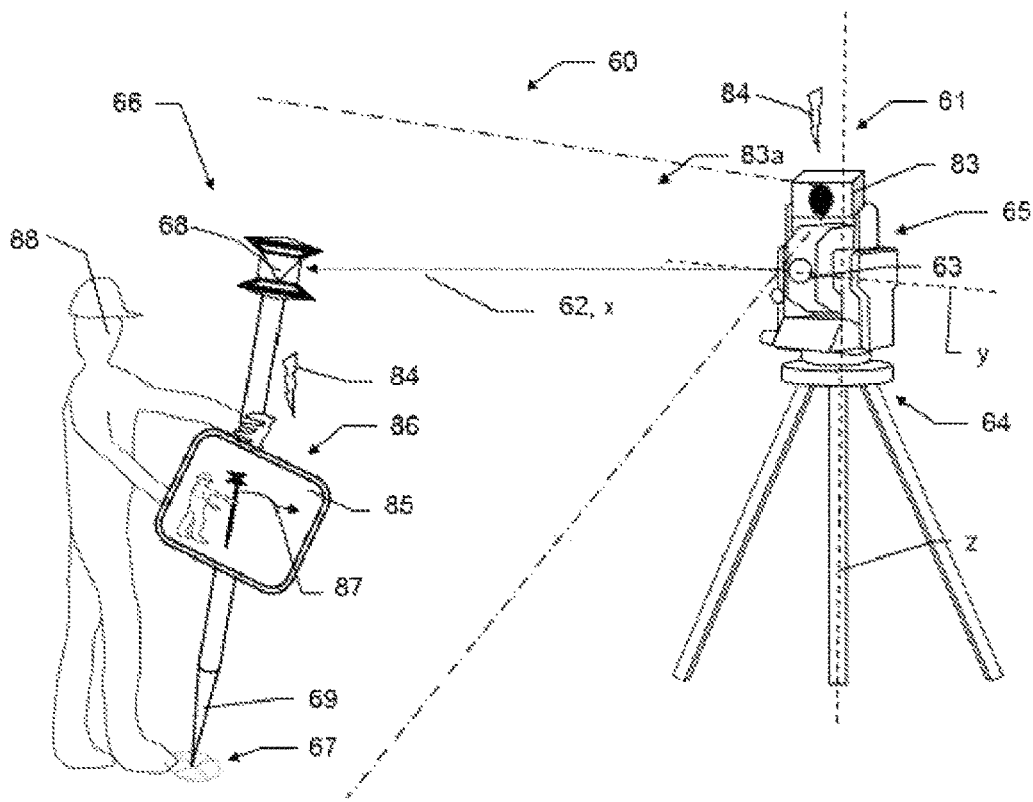
FIG. 7a-c show a development of the surveying system with calotte measuring functionality, FIG. 8a,b show a first example of an embodiment and application of a pen-like auxiliary measuring instrument.
Figure 7B:
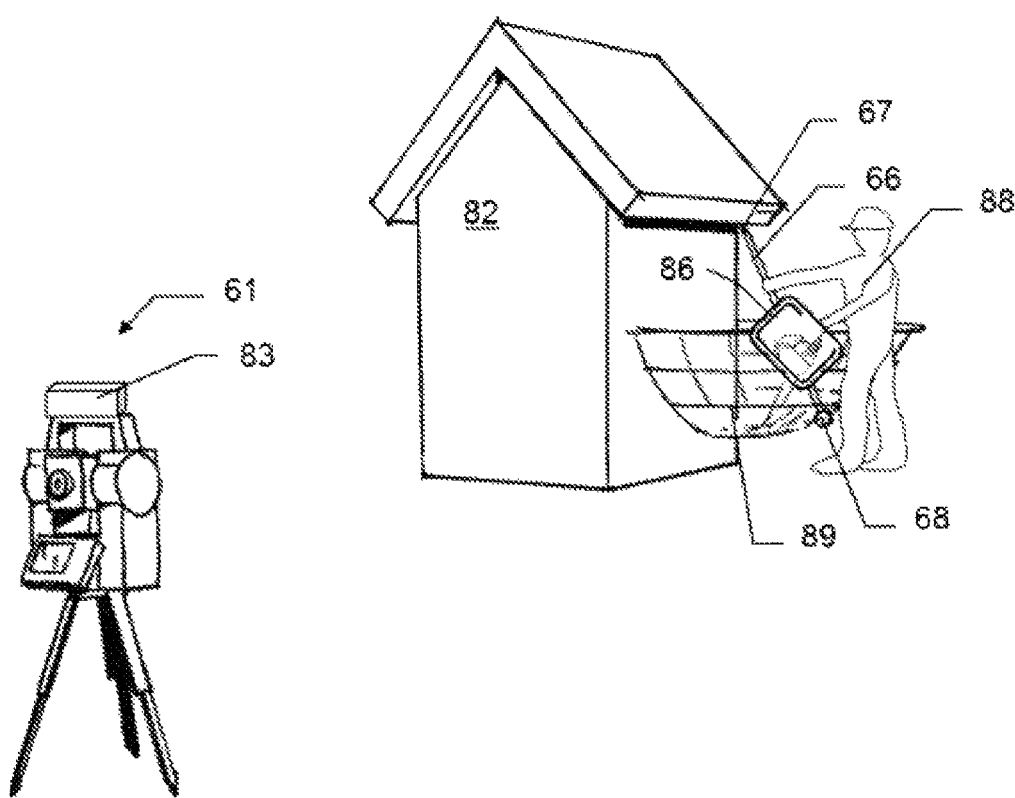
Figure 7C:
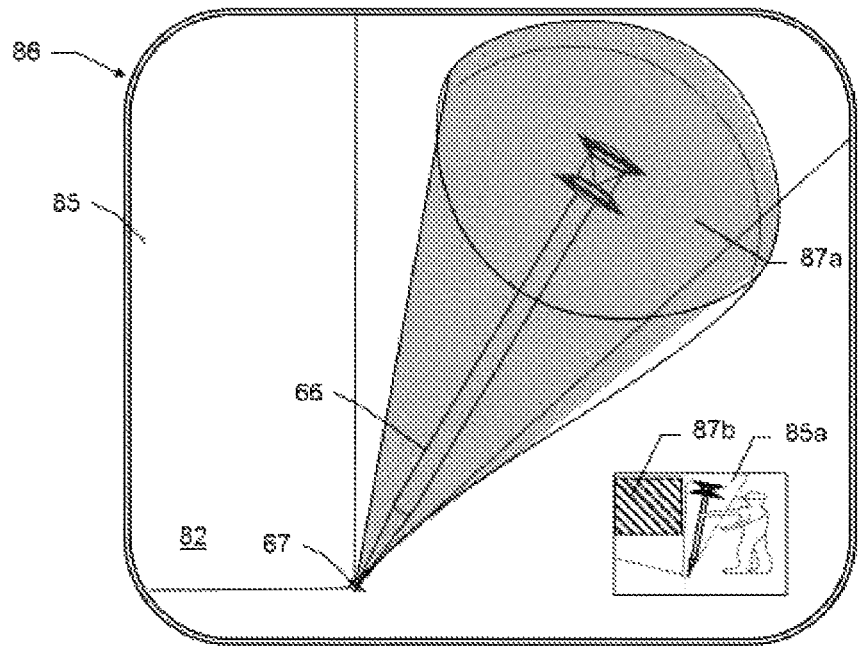

FIGS. 7a-c illustrate a development of the surveying system 60. In the example, a controller of the system 60 is designed in such a way that an instruction, for example a graphic instruction as shown, for the pivoting of the auxiliary measuring pole 66 to be performed by the user is displayed to the user on a display 86 of the auxiliary measuring instrument 66 (see FIG. 7a). That is to say that the system 60 prompts the user 88 with respect to providing the positions of the target 68. The prompting or instructing takes place in this case for example by an optimum arrangement or distribution of the target positions for the calculation of the flatteneddome being achieved. For example, the user 88 is instructed to pivot the auxiliary measuring instrument 66 in such a way that a distribution of the target positions that is as homogeneous or uniform as possible, or is over as large an area as possible, is achieved.

In the example, for providing graphic user prompting by means of a total station camera 83, which has a field of view 83a, which is at least coarsely aligned in the targeting direction x, an image 85 of the auxiliary measuring instrument 66 set up on the terrain point 67 together with the user 88 and a segment of the (measuring) surrounding area is recorded. On the basis of this image 85 recorded by the surveying device 61, individual target positions to be attained or a target position area are automatically or manually predefined. These are graphically marked in the image or a pivoting movement that leads to the target positions to be provided (arrow 87) is graphically marked in the image 85. The instruction image 85 thus prepared is then transmitted wirelessly (indicated by the symbols 84) to the display 86 of the marking pole 66 and displayed there to the user 88 on the display 86.

Since the camera image 85 is advantageously recorded from the viewpoint of the surveying device 61, the target positions suitable for an optimum calculation of a calotte can be estimated particularly well in it. Thus, instead of a generalized instruction, an instruction deliberately adapted to the specifically applicable measuring situation and spatial/locational circumstances can be produced and made available to the user 88.

Such an ascertainment of a suitable target position area 89 is schematically shown in FIG. 7b. The surveying device 61 records from its location, with its camera 83, an image of the measuring location around the terrain point 67, which includes at least the corresponding part of the building 82 and the user 88 together with the applied auxiliary measuring instrument 66. On the basis of this camera recording, the controller of the surveying system ascertains an area 89 within which the user 88 is to pivot the target 68. Areas that cannot be seen or aimed at by the surveying device 61, for example on account of being covered by the building 82, are thus deliberately excluded. An advantage of the surveying device perspective as a basis for the instruction of the user 88 is that from there it can be estimated with certainty which spatial areas or positions of the auxiliary measuring instrument are suitable for the calotte measurement and which are not.

FIG. 7c shows an example of the graphic instructional representation on a user display 86. In an image 85, the perspective of the user of the measuring surrounding area with the terrain point 67, the corner of the building 82 and the measuring pole 66 is artificially replicated on the basis of an image of the surveying camera. In this image 85, an area 87a within which the user is intended to pivot the auxiliary measuring instrument 66 is also indicated. As an option that is not shown, it is in this case indicated in a continually updated manner which parts of the area 87a the user has already covered, so that the user is kept informed the whole time which segment of the area 87a has not yet been covered. As a further option, as shown, apart from the image 85 imitating the viewpoint of the user, a further image 85a is displayed (as an image in the image), reproducing for example the viewpoint of the surveying device or its camera. Also this image optionally has user-prompting information, for example as shown the indication of an area 87b that is unsuitable for target position determination, for example because of a visual obstacle, and into which the user therefore should not move the target.

As an alternative or in addition to a camera-image-based instruction, the instruction is based on the first already measured target position or positions. That is to say that at least one target position is determined and on this basis it is for example calculated by the system controller which further target positions are to be assumed. As a further option, the display 86 is used to output a warning to the user 88 if target positions provided by the user cannot be determined, or only insufficiently, or are not suited or only poorly suited for the calotte calculation. Such an optical or else acoustic warning allows the user 88 to correct the pivoting.

Figure 8A:
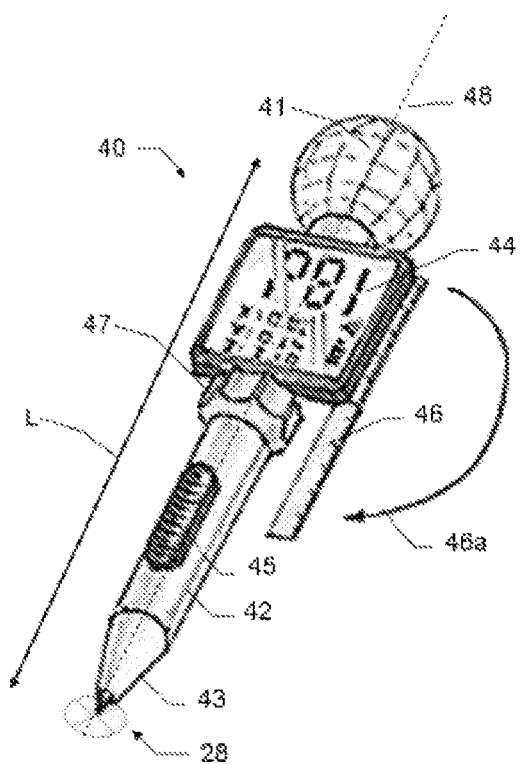

FIG. 8a shows a first exemplary embodiment of a pen-like auxiliary measuring instrument 40. The auxiliary measuring instrument 40 resembles in size and shape a pen; it has an elongate main body 42, the one end of which is designed as a tip 43. This tip 43 is intended for designating a point 28, which is to be measured or marked out with the aid of the auxiliary measuring instrument 40. The end 43 is configured in the example as a contact tip, with which a respective point 28 is designated by being touched. As an alternative, such a point 28 is designated contactlessly, for example in that at the end 43 there emerges the visible light of a laser distance meter, with which the point 28 can be marked in a punctiform manner and measures the distance between the auxiliary measuring instrument 40 or an auxiliary-measuring-instrument reference point and the point 28. As a further option, the contact for designating the point 28 is not arranged on the longitudinal axis 48, but at a distance from it at a defined angle, for example at right angles, so that the tip or the end 43 is L-shaped. Such a configuration may be advantageous in the case of certain surveying tasks, for example to contact and survey a point on the inner periphery of a pipe, conduit or hole.

In the case depicted, the distance between the reference point and the point 28 to be surveyed or marked out is already known on account of the fixed length L of the main body 42 or the auxiliary measuring instrument 40 and does not have to be separately measured for the determination of the position of the point 28. The position and orientation of the auxiliary measuring instrument 40 are in any case measured during the designation of the point 28 by a surveying device stationed at a distance, so that the absolute position of the point 28 can be ascertained on the basis of a known, absolute position of the surveying device, the position and orientation of the auxiliary measuring instrument 40 and the length L or the distance between the auxiliary measuring instrument 40 and the point 28.

In the example, as a measuring aid for determining the position and orientation of the auxiliary measuring instrument 40, there is a sphere attachment 41 at the "upper" end of the measuring pen 40. This sphere attachment 41 has on its surface a code which can be evaluated in a camera image (recorded by the surveying device) in such a way that the orientation of the sphere in relation to the image or the camera (or the surveying device) can be determined. On the basis of the depicted size of the sphere 41 and/or the code and/or a further code, the range between the camera and the sphere is also determined, from which, together with a measured or known recording direction (and if applicable position of the sphere or of the center of the sphere in the image), the position of the sphere can be determined (also see the description of FIG. 1).

The auxiliary measuring instrument 40 therefore has at least one body by means of which the orientation and/or position of the auxiliary measuring instrument 40 can be determined in interaction with an external surveying device, with which the auxiliary measuring instrument 40 forms a surveying system. Optionally, the pen 40 has a supporting inertial measuring unit (IMU), in order to make the location determination more robust or to bridge dead angles, in which location determination is not possible on the basis of the sphere 41 because the line of sight is interrupted. Also, such an IMU can be used in combination with position tracking on the basis of the position-indicating body 41, i.e. when there is a position-changing movement of the pen 40, a comparison of the IMU data with the position data that are obtained by the surveying device on the basis of the body 41 is performed.

As an alternative to the sphere body 41 that is shown, which allows both position determination and orientation determination, an auxiliary measuring pen 40 according to the invention has a body which allows the position determination with the surveying device, and the orientation is determined by means of internal sensors in the pen.

The auxiliary measuring pen 40 additionally has a man-machine interface, which in the example has a display 44, a scroll wheel 47 and a button 45. The display serves for displaying user information and is optionally touch-sensitive, in order to allow user inputs. As an alternative or in addition, the scroll wheel 47 serves for user input. The button 45, arranged separately on the main body 42 and also of an enlarged form, likewise serves for user input or control, wherein it serves especially for triggering the position determination of the point 28. Once the user has placed the pen 40 on the point 28 in a way suitable for surveying, the user initiates a command to the controller of the surveying system by means of the button, so that the position determination takes place.

The auxiliary measuring instrument 40 or the surveying system is optionally designed to prompt the user during a measuring task, for example to indicate the next action steps or in that a system controller gives instructions to the user via the display 44 in dependence on a continuously ascertained position and orientation of the pen 40, and consequently of the user. As a further optional feature, in the example the auxiliary measuring instrument 40 has a rule 46, with which lengths on the surveying site can be handily measured. In the example, this is designed such that it can be folded out (indicated in the drawing by the arrow 46*a*).

Figure 8B:
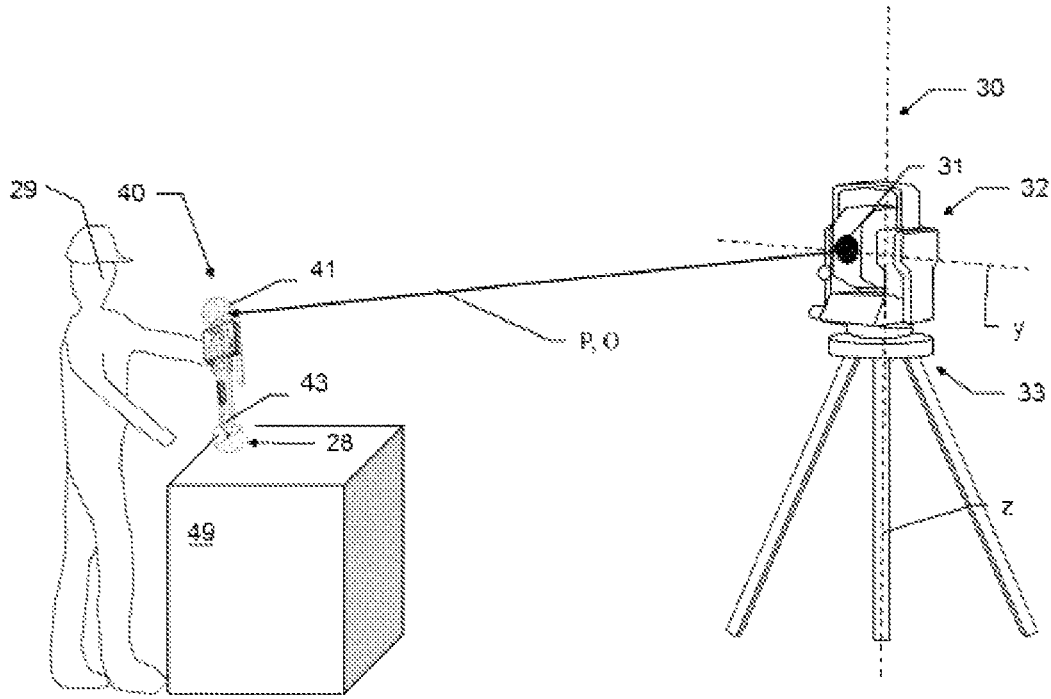

FIG. 8*b* shows an example of surveying an object point 28 with the aid of the auxiliary measuring pen 40. The pen 40 is ergonomically designed, for example by means of a gripping region for at least the thumb and index finger, and also in particular the middle finger, of a user, in such a way that—like a customary pen—it can be used by the user 29 in a one-handed manner, as shown. In order for example to survey a point of an object 49 in a terrain, for example outdoors or inside a building, a surveying device 30, for example a total station, is positioned in a known way, so that the device 30 can be aligned with the auxiliary measuring instrument 40. The surveying device has a camera 31 that can be pivoted about two axes y, z.

The camera aligned with the auxiliary measuring instrument 40, or to be more precise with its sphere attachment 41, records at least one image of the sphere attachment 41 when the auxiliary measuring instrument 40 designates the terrain point 28, that is to say in the example the user 29 uses his hand to bring the pen 40 onto the point 28, so that the tip of the pen touches the object point 28. By means of image evaluation of the camera image of the sphere attachment 41, the position and orientation of the pen 40 are ascertained. Starting from the known position and alignment of the surveying device 30, the position of the point 28 is ascertained by means of knowledge of the range or position of the auxiliary measuring instrument 40 and its alignment and also the length of the measuring pen 40 (or distance between an internal reference point of the pen 40 and the object point 28).

Here, the tip 43 is optionally designed as a probe which, when it makes contact with or touches the terrain point 28, automatically triggers the position determination or the recording of a camera image of the sphere attachment 41, wherein a corresponding command is output by the auxiliary measuring instrument 40 to a controller of the surveying device 30, for example by means of a Bluetooth connection.

As an alternative or in addition, when it is touched, the probe automatically triggers a measurement. As a further option, automatic triggering of a measurement or of a working operation takes place as soon as the pen 40 has assumed a desired position.

Instead of such a surveying operation, alternatively a desired position on the object 49 is marked by means of the pen, for example in that the tip of the pen is designed as a pen marker, for example in the manner of a felt pen or crayon. Consequently, the measuring pen 40 can also serve for staking out points.

The handy design of the auxiliary measuring instrument 40 in the manner of a pen, which can be easily used with one hand (for which purpose for example the center of gravity of the pen 40 is also situated in such a way that it allows it to be handled with one hand reliably and at least largely without fatigue), offers the advantage of much less laborious handling than conventional auxiliary measuring instruments of the generic type. Moreover, it also allows the marking of terrain points that cannot be reached for example with plumbing poles of the prior art, either because the plumbing pole cannot be positioned perpendicularly on the point as required or because the plumbing pole is too long. By contrast, with the present auxiliary measuring pen 40, on account of the ascertainment of all six of its degrees of freedom, contact can be made in any alignment and, on account of its handy, comparatively small size, even concealed points can be surveyed/marked out. Consequently, surveying operations in the near field or in confined spaces such as corners, casings, wall recesses, bay windows, in furniture etc. are also made possible.

Figure 8C:
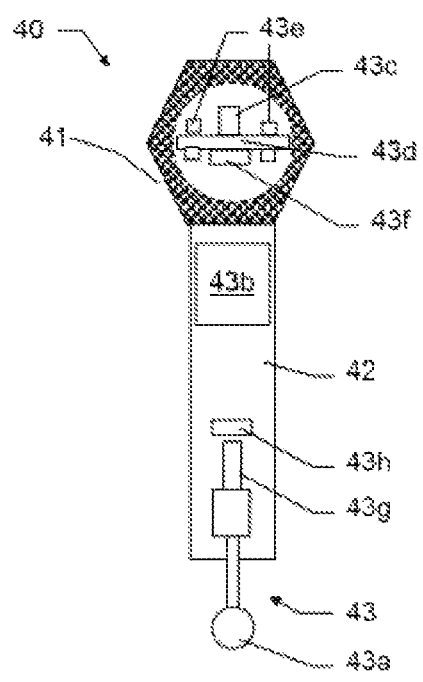

FIG. 8*c* shows in cross section a further exemplary embodiment of a measuring pen 40. The pen 40 has at its upper end a body 41, in the example configured as a polyhedron. The body 41 is the bearer of a code, which, as previously described, allows image-based determination of the location of the pen 40 by means of an external camera. Inside the body 41 there is a printed circuit board 43*d*, which in the example is the bearer of an inertial measuring unit (IMU) 43*f*. The IMU 43*f* serves for supporting the location determination, for example in order to make the location determination more robust or to bridge dead angles, in which location determination is not possible on the basis of the optical code, for example because the line of sight to the camera is interrupted. Furthermore, the printed circuit board 43d bears a communications module, for example in the form of an IRDA module. Moreover, inside there are four lighting means (LEDs) 43e (two on top and two underneath on the board 43d), whereby the body 41 is designed as a luminaire. The illumination is for example variable, for example in order to indicate the respectively applicable operating state of the pen 40 for example by means of different colors.

Apart from a battery 43b, the pen 40 has at its lower end 43 a probe ball 43a. In the example, the ball can be laterally deflected, so that lateral probing of objects is made possible. When there is such a probe ball 43a, the pen 40 is optionally additionally provided with electronic and/or mechanical correction of the extent of the ball, so that during the ascertainment of the point the size of the ball is automatically taken into account in a corrective manner. In the example, the deflection of the probe ball 43a is measured by means of magnets 43g coupled to the probe ball 43a, which are detected by a Hall element 43h. As an alternative, a piezo element serves for determining the deflection.

Figure 8D:
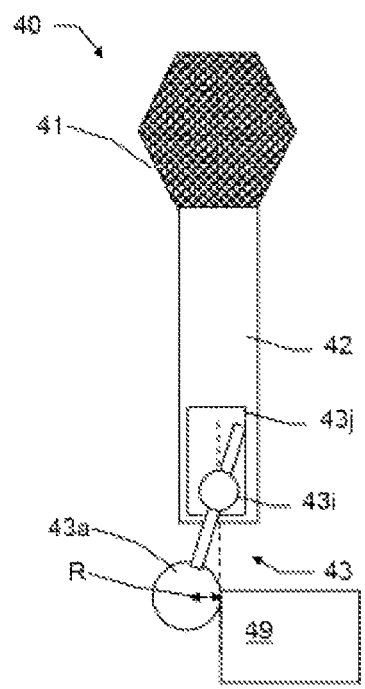

FIG. 8d shows a further embodiment of a pen 40 with a probe ball 43a. The probe ball 43a is arranged by means of a ball joint 43i in a mount 44j in the lower end 43 of the pen 40 in such a way that, during a measurement of a point of an object 49, the ball 43a is deflected exactly by the radius R of the ball. There is consequently a correction of the extent R of the ball 43a, in that a measured-value recording of an object point takes place precisely when the deflection caused by the probing of the object 49 corresponds to the ball radius R. This is ensured by the mechanical arrangement of the probe ball 43a.

FIG. 9a shows a further embodiment of a pen-like auxiliary measuring instrument 40. In the example, the auxiliary measuring instrument 40 has an exchangeable tip 43. This can be fitted on the main body 42 of the pen 40 by means of a holder 50 and removed again. In this way, various types of ends or tips 43 can be advantageously used, so that the functional scope of the auxiliary measuring instrument 40 can be extended in comparison with a fixed tip. For example, a purely marking tip, such as for example a felt pen tip, can be exchanged for a sensor tip, or a tool tip can be fitted. Also possible of course as an option are embodiments with more than one tip or more than one tool or sensor, which may be exchangeable or fitted in a fixed manner.

FIGS. 9b-9d show three examples of possible tip models. FIG. 9b shows a tip that is designed as a line laser 52. This allows laser lines to be indicated by means of the pen 40, for example on the wall of a building in the course of construction work.

FIG. 9c shows a further example of a tool tip. This is designed in the example as a spray tip 54, so that paint from a tank 55 can be applied by means of the pen 40, for example to the wall of a building, for example in order to mark layout geometries.

FIG. 9d shows a metal detector 53 as an example of a sensor tip, so that metals can be detected with the auxiliary measuring instrument 40.

The button 45 shown in FIG. 9a is optionally provided in the case of an active tip, such as for example one of the tips 52, 53 or 54, in order to trigger the respective function of the tip. For example, therefore, by actuating the button 45, a spraying operation with the spray tip 54 is triggered or the metal detector 53 is activated.

As a further option, shown in FIG. 9a, the holder 50 has a means 51 by which the respectively attached tip can be automatically identified. For example, as shown, there are electrical contacts 51, which have a corresponding counterpart on the tip 43 that identifies the respective tip 43, for example an ID chip. As a further example, the identification is performed optically by means of, in that for example an optical coding, such as for example a barcode, which is provided on the respective tip in the holding region, can be read by means of an optical unit 51. In the course of the identification, a transmission of the size/length of the tip takes place, so that the actual length of the pen is automatically taken into account during the ascertainment of the measurement results.

As a further option that is not shown, the holder 50 is provided in order to be able to receive extension pieces. Therefore, extension parts can be exchangeably fitted between the main body 42 and the tip 43, so that the length of the pen 40 is variable. This allows for example the length of the pen 40 to be adapted to different measuring tasks, for example increased in order to reach points in a relatively deep depression. As an alternative to such extension pieces that can be fitted, the length of the instrument 40 or its body 42 may be variably designed, in that the main body 42 is designed as a kind of telescopic pole. The tip 43 is consequently then retractable and extendable, particularly advantageously in a stepless manner. This may for example be performed by the user, in that the user turns the wheel 47a.

FIG. 9e shows a further example of a tip. This tip 56 has a measuring tape 57, which is secured in such a way that it can be wound up in a receiving container 59 attached to the tip 56. The receiving container 59 is either fixedly attached to the tip 56 or—in particular in the case of a non-exchangeable pen tip—removably fitted on the tip 56. The length of the measuring tape 57 is therefore variable, wherein the container 59 has an arresting mechanism (not shown), with which a chosen length of the measuring tape 57 can be set. The measuring tape 57 serves for example for manually measuring out distances from the point 28 contacted by the tip to a point in its vicinity. As an alternative or in addition, the end of the measuring tape 57 has, as shown, a marking means or a holder for such a marking means, so that for example, as shown, a pencil 58a can be connected to the measuring tape 57, and consequently the tip 56. Once the measuring tape 57 has been arrested, for example a circle or an arc of a circle 58 can therefore be drawn by the user, for example on a wall of a building, wherein the center point of the circle then lies on the longitudinal axis 48 (see FIG. 4a). Such marking out of a circle serves for example for marking a circular area in which a specific manual construction activity is intended to take place.

Figure 10:
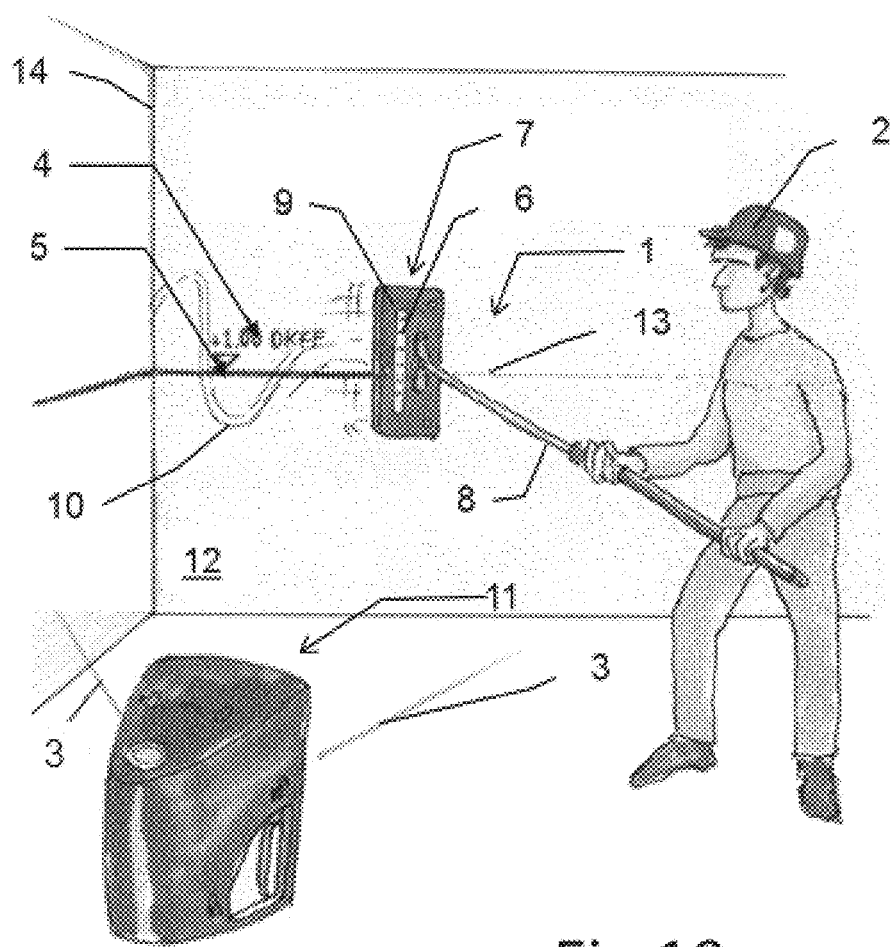
FIG. 10 shows a first example of a laser receiver with marking functionality.

FIG. 10 shows a first example of a laser receiver 1, which is designed for providing a physical, permanent marking 5 on a surface of a building 12. The laser receiver 1 has a housing 7 with a front surface 9 and a rear surface (not shown). The front surface 9 has a line detector 6, with which laser light 3 can be captured. The laser light 3 is emitted by a construction laser 11, for example a rotation laser, and represents in a known way a position reference, for example in the form of a reference plane 13, as shown. A position of the receiver 1 in relation to the position reference is inferred from the point of incidence of the laser light 3 on the detector 6 by means of a controller of the laser receiver (not shown). In the example, the vertical position of the receiver 1 can consequently be ascertained (at least as long as the detector 6 is moving within the reference light 13). As an alternative to the representation shown, the detector is of a flat design, so that it is additionally possible to infer an orientation (rotation) of the receiver about the axis perpendicular to the surface of the building 12.

The laser receiver 1 also has a handheld continuation 8 in the form of a stick. Moreover, the rear surface of the housing 7 is of a planar design in such a way that, by manually gripping the stick 8, a user 2 can displace the housing 7 or the laser receiver 1 along the surface of the building 12, wherein the receiver 1 strictly follows the profile of the surface of the building 12. To put it another way, the receiver 1 is designed in such a way that it can be manually guided in close contact with the surface of the building 12 over a large area. As an alternative to the embodiment shown, the housing 7 itself is shaped such that it can be held by a hand, for example by corresponding ergonomic indentations, and does not have a stick. Such a less bulky embodiment is particularly advantageous for small-scale marking tasks, whereas the embodiment shown with a stick 8 offers particular advantages for applications over larger areas.

The laser receiver 1 also has a marker (not shown), which is designed for example as an inkjet printer or laser inscriber, so that, in the state in which it is placed against the surface of the building 12, it can print onto or burn into the surface. In the case of a printer, it is either a single-color printer or a multi-color printer, wherein special inks or media, such as for example fluorescent paint or clear varnish, can optionally also be used for preserving/sealing an applied marking. Advantageously, the printer is designed also to be able to print on ceilings, that is to say against gravitational force. The marker may alternatively be designed for mechanical marking, for example as a center punch.

Furthermore, the laser receiver 1 has a memory (not shown), in which a planned position, for example as part of a plan of a building, is stored in a retrievable manner. Such a planned position is for example a location on the surface of a building 12, at which a hole is to be drilled or some other installation measure is to be performed. The memory may also be a volatile memory for only providing the position data for a short time. Then there is for example a cableless data transmission (by Wi-Fi or Bluetooth etc.) of the position data in real time from an external device (on the construction site or elsewhere, for example in a cloud), where the position data is stored in a permanent memory. A data transmission from an external device is optionally also used for example in order to output further information or control commands to the printer, for example with respect to the selection of the printing ink to be used.

This planned position is then physically and permanently marked positionally accurately on the surface of the building 12 with the aid of the laser receiver 1 (as a difference for example from a marking by means of light, which is not of a physical nature and ceases when the light emitter is removed (where "permanently" also includes that the marking 5 disappears after a certain period of time, for example in that it has been applied with a UV-sensitive paint, which by definition fades over time). For this purpose, the controller of the laser receiver 1 is designed in such a way that it is sufficient just to guide the receiver 1 or the housing 7 or the marker approximately over the planned location. The user 1 therefore displaces the receiver 1 over the surface of the building 12 by means of the stick 8 without having to know exactly where on the surface 12 a marking is to be provided. This task is undertaken by the controller, which retrieves the planned position and continuously compares the position of the laser receiver 1 given on the basis of the position reference with the planned position, in order when the planned position is reached or passed over to give a command to the marker to print a marking 5 at the planned position.

In other words, with a random, or at least not exactly targeted, movement 10, the user 2 passes the receiver over a certain surface area, somewhere within which the planned location is located, and as soon as the planned location is passed over "by chance" in the course of the movement 10, or as soon as the planned location is within a marking zone or printing area of the laser receiver 1 (that is to say "can be reached" by the marker), the controller triggers the marking operation on the basis of the position reference given by the laser beam. In the present example, it is expedient to use a visible laser beam 3, so that the user 2 only has to displace the receiver 1 along the laser line 13 that is visible on the surface of the building 12.

In the example, the laser receiver 1 is also designed to print further information onto the surface of the building 12 in addition to the (position) marking 5, for example a text 4 describing the marking 5 and/or additional graphics, so that for example working instructions based on the marking 5 are available directly at the installation site.

Since, for example, only a horizontal position reference is generally given by the light 3, but for a positionally accurate marking there must also be at least information on the position in the vertical direction, for example a second reference plane in the vertical direction is created by a second reference light, so that the planned position can be marked on the basis of the crossing point of the two reference planes. As an alternative or in addition, the laser receiver 1 has one or more position encoders (see the following figures), with which further degrees of freedom can be determined, so that the automatic positionally accurate marking is made possible.

Figure 11:
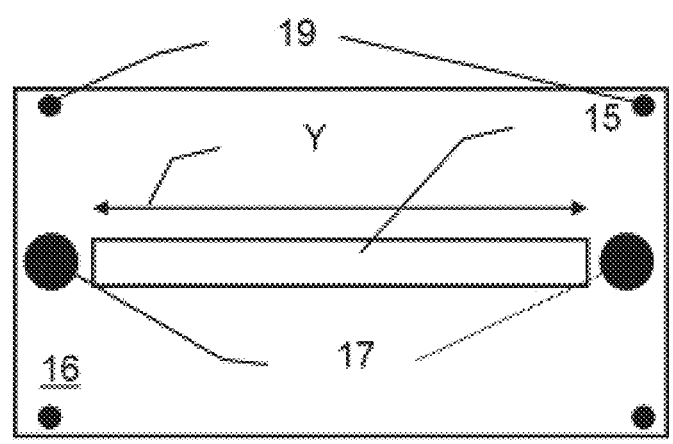
FIG. 11 shows an example of a laser receiver or construction-site printer with a position encoder.

FIG. 11 shows an example of a laser receiver or construction-site printer that has a position encoder. The rear surface 16 of the housing is shown, having a linear printing area 15 and two position encoders 17.

The printing line 15, for example a row of inkjet nozzles, allows printing over a surface area. Moreover, by contrast with a punctiform printing area, a greater printing width Y is available, so that, for example for providing a punctiform marking, it is sufficient to pass over the planned location somewhere on the width Y, to allow this location to be marked. That is to say that the "tolerance" of the at least partially undirected or untargeted manual displacement is increased. In a practical respect, there is a considered compromise between as large a printing area as possible and the handiness and/or production costs of the printer.

The position encoders 17 are designed in the example as optical or mechanical position encoders (as known for example from computer mouse devices), whereby a relative displacement covered by the laser receiver (and if applicable also the extent of a rotational movement) along the surface of the building can be measured. By means of such a measurement of the displacement in the manner of dead reckoning, for example the horizontal position of the printer or laser receiver can be continuously determined on the basis of a known location. For example, the edge of the building 14 (see FIG. 10) serves as such a defined starting point in the horizontal direction, so that the user 2 places the receiver 1 against this edge 14 and from there passes it over the wall 12 in the plane 13.

In the example, the rear surface also has at the corners four probing elements or guiding elements 19, designed as rollers or balls. These make it easier for the housing to be precisely displaced so as to follow the profile of a surface of a building. As an alternative or in addition to the rollers or balls 19, for this purpose the housing has rolls.

Since, with such a position encoder 17, a vertical distance can also be measured, the position data of the position encoder 17 are optionally used to increase the robustness of the position referencing by means of the position-reference laser light. For example this is used for bridging areas within which a position referencing is not possible on the basis of the laser light, for example since the laser beam cannot reach all of the surface of the building concerned because of an obstacle. Therefore, shaded locations can nevertheless then be marked positionally accurately.

Figure 12:
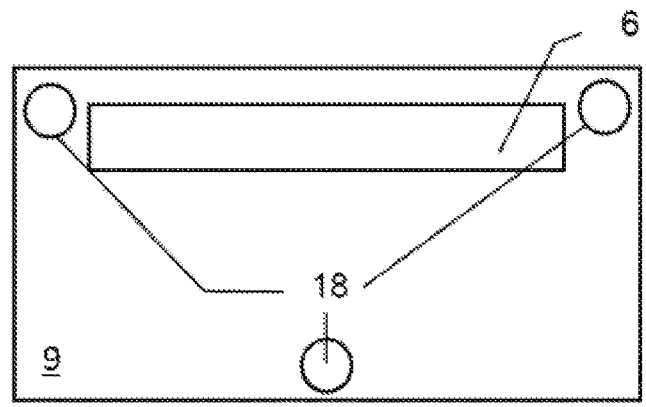
FIG. 12 shows a further example of a laser receiver or construction-site printer with a position encoder.

FIG. 12 shows an alternative embodiment of a position encoder. The front side 6 of the receiver or printer housing is shown. Apart from the laser detector line 6, the front side has three lighting means 18, for example designed as LEDs, which are arranged in a defined manner on the front side. These LEDs are recorded as points of light by an external camera, such as for example surveying devices of the prior art have. Since the arrangement of the LEDs is known to the surveying device, the spatial orientation of the housing can be inferred from the image of the LEDs in a way known per se. As an option, the position encoder is designed in such a way that it is possible to dispense with position referencing by means of laser light or the presence of a laser detector, i.e. in an embodiment as an alternative to the representation shown all of the necessary position and/or orientation information is ascertained and provided throughout by the position encoder.

In the case given by way of example that the receiver is strictly guided on the surface of the building, which for marking a horizontal surface area can also be ensured for example by a cardan suspension (i.e. it is mechanically ensured that the printer is aligned perpendicularly throughout), the movement is consequently restricted to the plane of the surface area, i.e. it is already known or predetermined apart from two translational variables and one rotational variable. Consequently, in such a case it is sufficient for there to be one position encoder, which determines the movement with respect to these three degrees of freedom or, in the case of position referencing in the vertical direction on the basis of the detected laser light, also only with respect to one translational (horizontal) degree of freedom and one rotational degree of freedom (rotation of the housing in the planes of the surface area). The normal to the plane/surface area can in this case be determined for example by means of the trajectory of the printer movement on the surface area. For example, the position encoder then has an inclination sensor and a yaw-angle sensor.

If there is no such restriction or partial predetermination of the movement because the construction-site printer is not moved along on the surface of the building (in close proximity to it), the position encoders or encoder are preferably designed for determination with six degrees of freedom. For example, the lighting means 18 are therefore selected in number and arrangement in such a way that the location and orientation of the receiver or printer can be determined with them (by means of an external measuring device) with respect to all six degrees of freedom. Here, too, an alternative option is to dispense with position referencing by means of laser light or the presence of a laser detector.

As an alternative to a handheld marker, it has a drive and is designed as an autonomous or semiautonomous vehicle (ground-based, UGV or air-based, UAV). In such embodiments, a determination with six degrees of freedom is particularly advantageous, in order for it to be possible to dispense with a strict guidance of the device along the surface of the building, but for example the distance from the surface or the alignment about all three axes of rotation may also be variable—at least within certain limits.

Figure 13A:
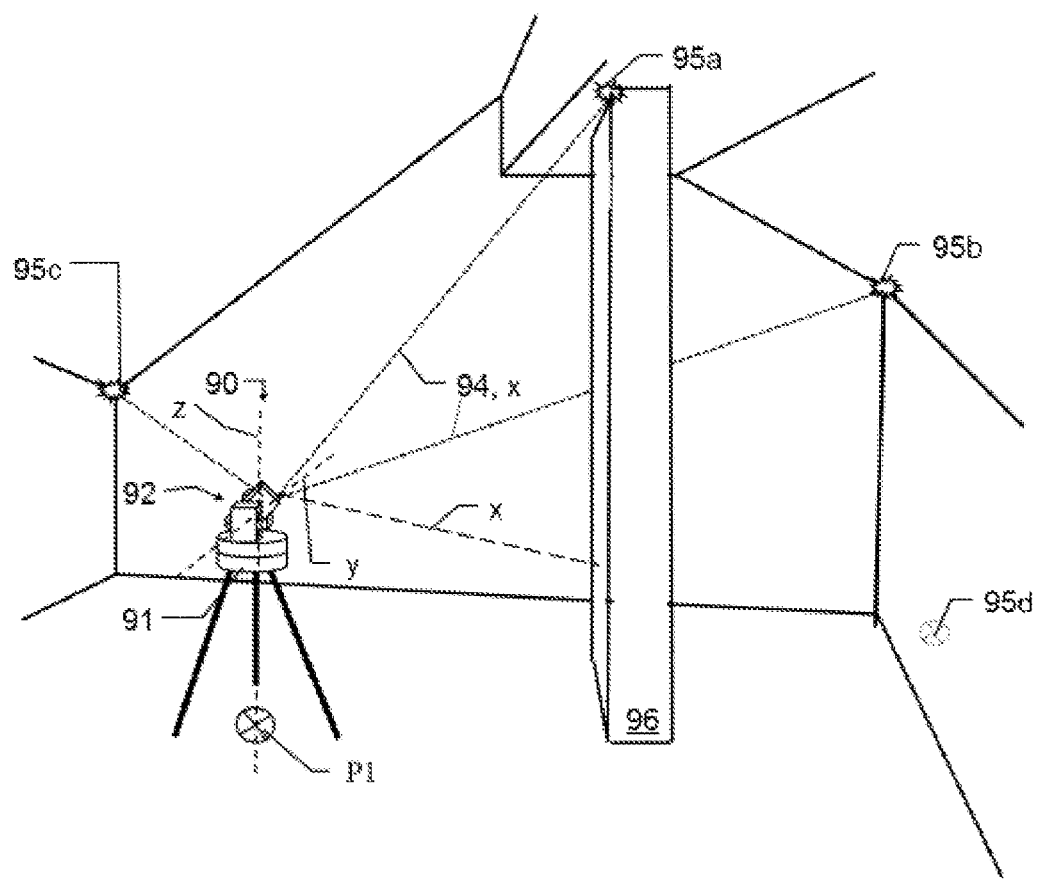
FIG. 13a-c show an example of a method for surveying and/or marking object points with relocation of the surveying device.
Figure 13B:
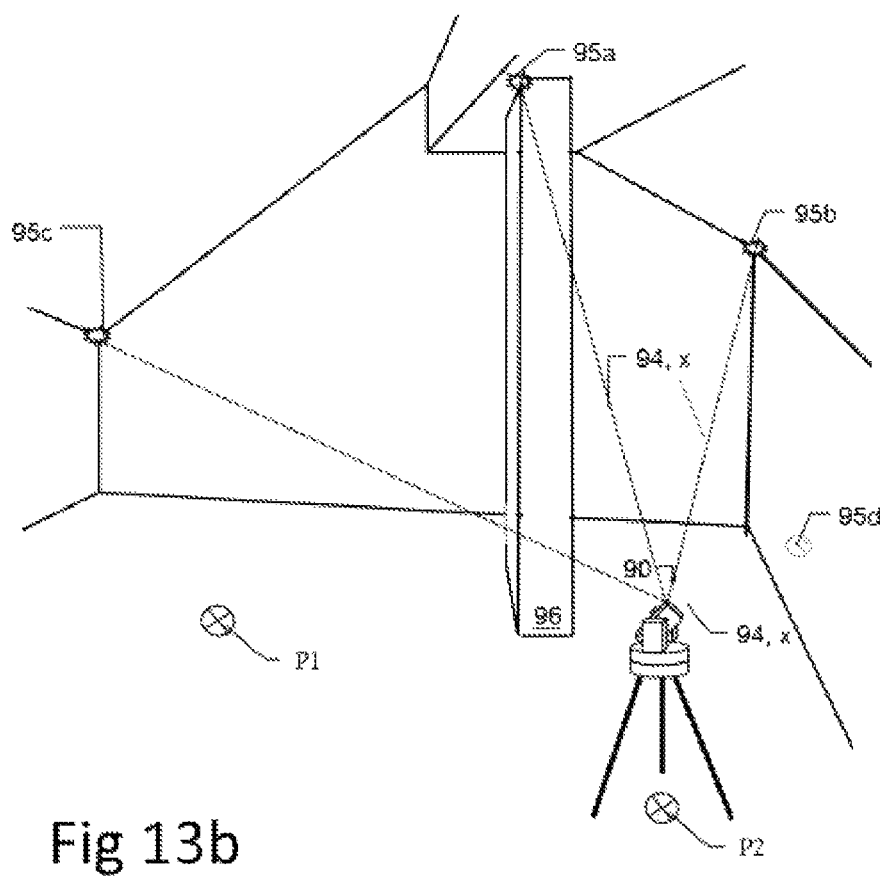
Figure 13C:
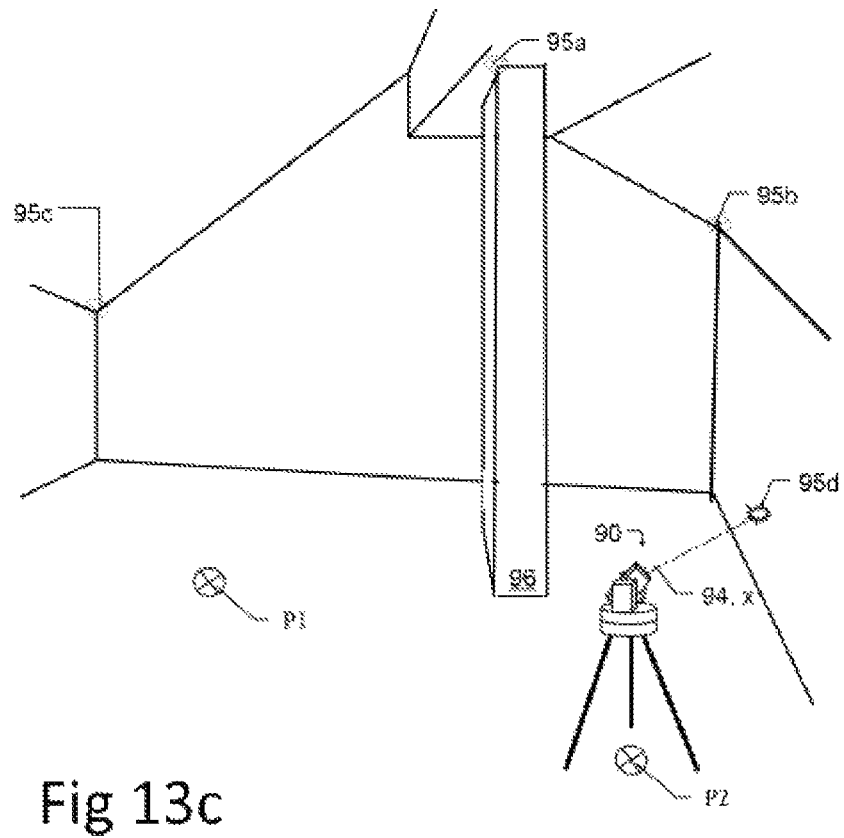

FIGS. 13*a*-13*c* illustrate a method for marking points on an object on the basis of planned positions for purposes of constructional activities. Shown is a stationary surveying device 90, which has a base 91 and a targeting unit 92 arranged on the base 91. The targeting unit 92 is rotatable with respect to the base 91 about two axes z and y and is designed for the emission of a laser beam as a free beam 94 in a target direction x onto the object, which in the example is an interior room. The respectively applicable target direction is measured for example by two angle meters for the respective axis z, y. The measuring and marking device 90 serves for the measuring-based capture and marking of points 95*a*-95*d* in three-dimensional space. With the measuring and marking device, lines over a distance, in particular distances, surface areas and formed by a number of surface areas can be surveyed.

Object points or their associated positions can be ascertained in polar coordinates from the measured values supplied for the two solid angles from the axes z and y and the range reported by a laser distance meter of the surveying device 90 in a controller of the device 90 with single-point evaluating functionality and stored at least for a certain time. In a known way, a distance can be calculated from two spatial points 95*a*, 95*b* and a surface area can be calculated from three spatial points 95*a*, 95*b*, 95*c*. In this way, a space formed by a number of surface areas or walls can be recorded, surveyed and stored as a spatial model.

With the surveying device 90, in the reverse way, marking points can be projected with any desired repeating accuracy within the measuring resolution onto a surface area, for example one of the walls shown. When it is incident on the surface area, the optically visible laser beam 94 generates a visible point of light. A permanent marking can then be provided at this location manually or by means of a self-marking laser receiver or construction-site printer explained above.

The position or the coordinates of the required marking points are stored in a device memory or are calculated by the controller. For this, the required position data are input or recorded, for example manually or by means of an interface. These data may be for example distances to be removed or angles from such reference lines or points of the surface area or of the space. To go to a stored or calculated position or object point be marked, the aiming direction x is changed manually or automatically until the deviation from the desired alignment calculated on the basis of the data is equal to zero, also taking into account here if applicable the distance from the surface area measured by measuring beam 94. In the example, the controller is capable of carrying out calculations with the measured spatial points 95*a*-95*d* and a three-dimensional depiction of the surrounding space.

Instead of a laser beam 94, the marking beam may also consist of some other optically visible light beam or the like. It is also possible to make the marking beam only visible by surface reactions when it is incident on an object. The measuring beam does not have to be optically visible per se. Rather, the range of a spatial point 95*a*-95*d* may be measured in any way desired, allowing an additional optical device to be used for aiming at the spatial point 95*a*-95*d*.

The object points 95*a*-95*d* to be marked for purposes of constructional activities are for example a series of drilled holes in the walls, the ceiling or the floor. These drilled holes therefore represent the desired marking points 95*a*-95*d*. The (desired) positions of the desired drilled holes are stored in a retrievable manner in the memory of the surveying device 90. The actual dimensions of the space, which are required for ordering the system, are provided for example by surveying with the surveying device 90 itself in the course of, or in direct preparation for, the marking activity, but may alternatively also be provided on the basis of a digital plan of the building or model of the building and/or a previous survey at a time longer ago.

For this purpose, the surveying device 90 is as far as possible positioned in the middle of the space to be surveyed in such a way that all of the points to be measured or marked can be reached by the laser beam 94. It must also be ensured per se during the entire measuring and marking operation that the measuring and marking device 90 does not change its positioning P1 in the space, i.e. the reference location P1.

However, this ideal situation does not always exist or can be established, for example because not all of the required measuring or marking point can be aimed at by a single positioning, it being possible that the positioning is chosen unfavorably by the user or, depending on the measuring environment, no positioning that satisfies these conditions can be found in the first place. For example, as shown in FIG. 13a, the point 95d cannot be surveyed or marked from the first positioning P1, since the obstacle, the pillar 96, is in target direction x, and consequently covers the measuring beam 94.

Therefore, once the points 95a-95c that can be reached from the first positioning P1 have been surveyed or marked, it is ascertained whether and which object points have not yet been surveyed or marked. In the example, it is therefore established for example that the point 95d has not yet been marked or cannot be marked from the first positioning P1 (see FIG. 13a). A relocation of the surveying device 90 is necessary in order to be able to mark the missing object point 95d. In preparation for this, a first depiction of the surrounding area is produced with a camera of the surveying device 90, that is to say a camera image at least of part of the space is recorded. As an alternative, such a depiction of the surrounding area may for example also be produced by means of a laser scan.

Then, the surveying device 90 is changed over from the first positioning P1 to a second positioning P2 (see FIG. 13b). In order then, in spite of the changed reference location and without having to carry out laborious manual position referencing known from the prior art, a further depiction of the surrounding area is automatically produced from the second positioning P2, that is to say for example a second camera image is recorded. In this second camera image, the already captured points 95a-95c are automatically detected by the controller by image evaluating methods known per se on the basis of the first camera image. Since their positions are known and stored in the memory, the coordinates of the second positioning P2 can be inferred from this by automatic surveying from the second positioning P2, as indicated in FIG. 13b. The second positioning is consequently positionally determined on the basis of the known first positioning P1.

Then, as shown in FIG. 13c, the point 95d on the building that is still missing and can be aimed at from the second positioning P2 is marked from the then known positioning P2. The automatic self-determination of the new positioning P2 by the surveying device 90 therefore advantageously allows a simple method by which covered object points can be surveyed or marked. As an alternative or in addition to the aforementioned determination of the second positioning P2 on the basis of a comparison with the first camera image recorded from the first positioning, a comparison of the second depiction of the surrounding area with a stored digital plan of the building or room, which for example as mentioned above has been produced by means of measurements from the first positioning P1, is performed to determine the second positioning P2. As an alternative or in addition, the determination of the second position is performed by means of structure-from-motion algorithms known per se, on the basis of data of an IMU and/or camera data.

Optionally, before the relocation of the surveying device 90, a proposal for the second positioning P2 is output on a display as an instruction for the user by the controller of the surveying device 90. The controller therefore determines for example on the basis of the known positioning P1 or on the basis of a plan of the building or room and the stored position of the still missing object point 95d, or the target direction x based on it, which positioning or which positioning area in the room comes into question or is optionally suited for surveying or marking the missing object point or points, for example with respect to the range from an object point or a number of/all of the missing object points.

Regarded for example as optimally suited is a location of which the angle of incidence of the laser beam 94 on locations to be surveyed or to be marked is incident with a cross section that is distorted as little as possible. Shallow angles of incidence of the beam are unfavorable, for which reason positionings that lead to such shallow incidence are ruled out, and instead one or more positionings are ascertained that allow the incidence of the laser beam 94 to be as perpendicular as possible for one or more object points still to be surveyed or to be marked.

This instruction or this positioning proposal is preferably displayed to the user in a graphic form on a device display, for example embedded in a 2D or 3D representation of the room or a plan of the building or room.

It is obvious that these illustrated figures only schematically represent possible exemplary embodiments. The various approaches can also be combined according to the invention with one another and with surveying devices and surveying methods of the prior art.

What is claimed is:

1. An auxiliary measuring instrument, configured to form together with a ground-based surveying device having range-and-direction measuring functionality, a system for surveying or staking out object points, wherein the auxiliary measuring instrument comprising:
   a handheld main body of a defined length;
   a man-machine interface;
   wherein the auxiliary measuring instrument is designed in a pen-like form and size and is configured to aim at an object point to be surveyed or staked out in a one-handed manner with a first end of the auxiliary measuring instrument and wherein a body is attached at a second end of the auxiliary measuring instrument, wherein the body is designed for optical-image-based determination of the position of the auxiliary measuring instrument by the surveying device.

2. The auxiliary measuring instrument as claimed in claim 1, wherein the body has an optical two-dimensional (2D) code formed on a surface thereof, and wherein an orientation and range of the body and the location of the auxiliary measuring instrument is determined by image evaluation of a camera image of the 2D code and on the basis of stored decoding information.

3. The auxiliary measuring instrument as claimed in claim 1, wherein the auxiliary measuring instrument has an inertial measuring unit, such that the location of the auxiliary measuring instrument is determined by a combination of measurement data of the inertial measuring unit and measurement data determined on the basis of the body.

4. The auxiliary measuring instrument as claimed in claim 1, wherein the first end is configured as a self-triggering sensor tip, which on contact automatically triggers a measurement.

5. The auxiliary measuring instrument as claimed in claim 1, wherein the first end is configured as a probe ball with electronic or mechanical correction of the measuring offset on the basis of the size of the probe ball.

6. The auxiliary measuring instrument as claimed in claim 5, wherein in order to to correct the measuring offset, the auxiliary measuring instrument is configured such that, for surveying an object point, the probe ball is deflected by the radius of the probe ball.

7. The auxiliary measuring instrument as claimed in claim 1, wherein the first end is exchangeable, in that the main body has a holder provided for receiving different tool or sensor tips.

8. The auxiliary measuring instrument as claimed in claim 7, wherein the holder has a sensor system for automatically identifying the respective tip.

9. The auxiliary measuring instrument as claimed in claim 7, wherein the tool or sensor tip is configured as:
a marking pen,
an active tool tip, or
a sensor tip.

10. The auxiliary measuring instrument as claimed in claim 1, wherein the man-machine interface has at least one selected from the group consisting of:
a touch-sensitive display,
a scroll wheel,
a microphone,
a lighting means, and
a triggering button that is separately formed or separately arranged on the main body, wherein
the triggering button is configured to trigger the position and orientation measurement of the auxiliary measuring instrument or
the auxiliary measuring instrument has an active tool tip or sensor tip and the triggering button triggers an action of the tool tip or a measurement with the sensor tip.

11. The auxiliary measuring instrument as claimed in claim 1, wherein the auxiliary measuring instrument has a measuring tape of variable length.

12. The auxiliary measuring instrument as claimed in claim 1, wherein the length of the auxiliary measuring instrument is variable in a defined manner.

13. The auxiliary measuring instrument as claimed in claim 1, wherein the auxiliary measuring instrument has a communications interface.

14. A surveying system with a ground-based surveying device having range-and-direction measuring functionality and an auxiliary measuring instrument as claimed in claim 1.

15. The surveying system as claimed in claim 14, wherein the surveying device comprises:
a base,
a targeting unit which defines a target direction and can be pivoted with respect to the base about at least one axis,
an angle meter and an angle-measuring functionality for measuring the target direction, and
a controller with single-point determining functionality, in the execution of which, controlled by the controller, a position of an object point designated with the aid of the auxiliary measuring instrument is determined.

16. A method for determining the position or marking an object point, the method comprising:
aiming at the object point with an auxiliary measuring instrument as claimed in claim 1;
determining the position and orientation of the auxiliary measuring instrument during the aiming at the object point, wherein at least the position is determined by means of a ground-based surveying device; and
determining the position or marking the object point, starting from a known position of the surveying device.

17. The auxiliary measuring instrument configured to form, together with a ground-based surveying device having range-and-direction measuring functionality, a system for surveying or staking out terrain points, wherein the auxiliary measuring instrument comprises:
a handheld main body with a defined longitudinal axis, configured such that the auxiliary measuring instrument is able to be aimed at a terrain point;
a distance from a reference point of the main body to the terrain point is predefined or given or is determined by the auxiliary measuring instrument;
a target, which is attached to the main body in a defined and known spatial relationship with the longitudinal axis and with the reference point and the position of which is determined by the surveying device,
wherein, by aiming at the terrain point with the auxiliary measuring instrument, a target position linked with the terrain point is displayed,
wherein on the main body, in a defined and known spatial relationship with the longitudinal axis, a body is attached, and
wherein the body has an optical, two-dimensional (2D) code formed on the surface thereof, wherein the 2D code is configured such that an orientation of the body and consequently the orientation of the auxiliary measuring instrument is determinable by image processing of a camera image of the 2D code on the basis of stored decoding information.

18. The auxiliary measuring instrument as claimed in claim 17, wherein the code is configured and distributed over the surface of the body such that the orientation of the auxiliary measuring instrument can be objectively determined on the basis of a segment of the surface of the body, and consequently the code, recorded in a camera image.

19. The auxiliary measuring instrument as claimed in claim 17, wherein the code has at least a first and second resolution stage, wherein the first resolution stage is designed for image recording and code evaluation in the near range and the second resolution stage is designed for image recording and code evaluation in the far range or the first resolution stage serves for coarse inclination and orientation determination and the second resolution stage serves for fine inclination and orientation determination.

20. The auxiliary measuring instrument as claimed in claim 17, wherein the code is arranged in two parts on the surface of the body, in that a first part serves for coding a first direction on the surface of the body and a second part serves for coding a second direction.

21. The auxiliary measuring instrument as claimed in claim 20, wherein the target is integrated in the body.

22. The auxiliary measuring instrument as claimed in claim 17, wherein:
the auxiliary measuring instrument has a light source, with which the surface of the body can be illuminated, or the body has at least one outer layer of unbreakable material and is arranged on the main body, and is dimensioned such that damage to the auxiliary measuring instrument in the event of impact is minimized or prevented by the body.

23. A ground-based surveying system with a surveying device having range-and- direction measuring functionality and an auxiliary measuring instrument as claimed in claim 17, wherein
the surveying device has a camera capable of capturing and recording at least a segment of a two-dimensional image disposed on a surface of the body,
the system has a decoding instruction, stored in a memory, for decoding the code and also a controller with decoding functionality, configured to evaluate the code depicted in the camera image on the basis of the decoding information to determine an orientation of the auxiliary measuring instrument.

24. The surveying system as claimed in claim 23, wherein the controller is configured such that, as part of the decoding functionality,
a circle is fitted to the depiction of the body in the camera image;
the center of the depiction of the body is ascertained by means of the fitted circle; and
the code that is present in a surface segment situated around the center is decoded.

25. The surveying system as claimed in claim 23, wherein the surveying device comprises:
a base;
a targeting unit, which defines a target direction and can be pivoted with respect to the base about at least one axis;
at least one angle meter and also an angle-measuring functionality for measuring the target direction;
a range meter for measuring a range from the target in the target direction; and
a controller with single-point determining functionality, in the execution of which, controlled by the controller, a position of a terrain point designated with the aid of the auxiliary measuring instrument is determined on the basis of the measured target direction, wherein the range between the target and the surveying device and the orientation of the auxiliary measuring instrument is determined on the basis of the body.

26. The surveying system as claimed in claim 25, wherein the targeting unit comprises:

a beam source for generating a measuring radiation, and also an optical unit for emitting the measuring radiation as a free beam in the target direction, and
an electro-optical detector for detecting measuring radiation reflected by the target from which the range from the target is determined,
wherein, in the execution of the single-point determining functionality, the target of the auxiliary measuring instrument is aimed at by means of setting the target direction, so that measuring radiation hits the target, and
wherein, the range between the target and the surveying device is determined by means of the measuring radiation.

27. The surveying system as claimed in claim 25, wherein the surveying device has a drive for automatically changing the target direction and a target-tracking functionality such that, on activation of the target-tracking functionality, the target direction automatically follows a moving auxiliary measuring instrument, wherein the target-tracking functionality is based on an evaluation of the camera image of the body.

28. The surveying system as claimed in claim 25, wherein the code is evaluated irrespective of the range of the surveying device from the auxiliary measuring instrument.

29. A method for determining the position of a terrain point, the method comprising:
aiming at the terrain point with an auxiliary measuring instrument of claim 25;
measuring the range from and direction in relation to the target provided by the auxiliary measuring instrument during the aiming at the terrain point from a ground-based surveying device;
providing the distance between the target and the terrain point;
determining the orientation of the auxiliary measuring instrument by means of image evaluation of a camera image, in which at least part of the attached body is depicted; and
determining the position of the terrain point, starting from a known position of the surveying device based on the basis of the range, direction, distance, and orientation.

30. A method as claimed in claim 29, wherein in the case of movement of the auxiliary measuring instrument, the auxiliary measuring instrument is tracked by the surveying device by means of evaluation of continuously recorded camera images of the attached body.

* * * * *